United States Patent
Nowak et al.

(10) Patent No.: US 10,865,267 B2
(45) Date of Patent: *Dec. 15, 2020

(54) COMPOSITIONS FOR FABRICATING DURABLE, LOW-ICE-ADHESION COATINGS

(71) Applicant: HRL Laboratories, LLC, Malibu, CA (US)

(72) Inventors: Andrew P. Nowak, Los Angeles, CA (US); April R. Rodriguez, Santa Monica, CA (US); Elena Sherman, Culver City, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,123

(22) Filed: Sep. 27, 2018

(65) Prior Publication Data

US 2019/0023830 A1    Jan. 24, 2019

Related U.S. Application Data

(63) Continuation-in-part of application No. 15/608,975, filed on May 30, 2017, and a continuation-in-part of
(Continued)

(51) Int. Cl.
*C09D 175/08* (2006.01)
*C08G 18/50* (2006.01)
(Continued)

(52) U.S. Cl.
CPC .............. *C08G 18/12* (2013.01); *C08G 18/10* (2013.01); *C08G 18/4833* (2013.01);
(Continued)

(58) Field of Classification Search
CPC ...... C09D 175/08; C08G 18/12; C08G 18/10; C08G 18/4833; C08G 18/5015; C08G 18/758
See application file for complete search history.

(56) References Cited

U.S. PATENT DOCUMENTS 3,435,003 A   3/1969 Craven
3,810,874 A   5/1974 Mitsch et al.
(Continued)

FOREIGN PATENT DOCUMENTS

EP    1558661 B1    12/2012
WO    1997035919 A1    10/1997
WO    2013158360 A1    10/2013

OTHER PUBLICATIONS

"Reduced Phase Separation and Slowing of Dynamics in Polyurethanes with Three-Dimensional POSS-Based Crosslinking Moieties" to Raftopoulos et al. Macromolecules 2015, 48, 1429-1441.*
(Continued)

*Primary Examiner* — Michael L Leonard
(74) *Attorney, Agent, or Firm* — O'Connor & Company

(57) ABSTRACT

This invention provides durable, low-ice-adhesion coatings with excellent ice-adhesion reduction. Some variations provide a low-ice-adhesion composition comprising a composite material containing at least a first-material phase and a second-material phase that are nanophase-separated on a length scale from 10 nanometers to less than 100 nanometers, wherein the first-material phase and the second-material phase further are microphase-separated on a length scale from 0.1 microns to 100 microns. The larger length scale of separation is driven by an emulsion process, which provides microphase separation that is in addition to classic molecular-level phase separation. The composite material has a glass-transition temperature above −80° C. The coatings may be characterized by an AMIL Centrifuge Ice Adhesion
(Continued)

Reduction Factor up to 100 or more. These coatings are useful for aerospace surfaces and many other applications.

22 Claims, 15 Drawing Sheets
(12 of 15 Drawing Sheet(s) Filed in Color)

Related U.S. Application Data application No. 14/829,640, filed on Aug. 19, 2015, now Pat. No. 10,125,227.

(60) Provisional application No. 62/624,226, filed on Jan. 31, 2018, provisional application No. 62/345,250, filed on Jun. 3, 2016, provisional application No. 62/038,878, filed on Aug. 19, 2014.

(51) Int. Cl.

| | |
|---|---|
| C08G 18/12 | (2006.01) |
| C08G 18/48 | (2006.01) |
| C08G 18/75 | (2006.01) |
| C09D 127/14 | (2006.01) |
| C09D 127/16 | (2006.01) |
| C08G 81/02 | (2006.01) |
| C08G 18/10 | (2006.01) |
| C09D 7/61 | (2018.01) |
| C08G 81/00 | (2006.01) |
| C09D 187/00 | (2006.01) |
| B64D 15/00 | (2006.01) |
| C09D 7/65 | (2018.01) |

(52) U.S. Cl.
CPC ....... *C08G 18/5015* (2013.01); *C08G 18/758* (2013.01); *C08G 81/00* (2013.01); *C08G 81/025* (2013.01); *C09D 7/61* (2018.01); *C09D 127/14* (2013.01); *C09D 127/16* (2013.01); *C09D 175/08* (2013.01); *C09D 187/005* (2013.01); *B64D 15/00* (2013.01); *C09D 7/65* (2018.01)

(56) References Cited

U.S. PATENT DOCUMENTS

| | | | |
|---|---|---|---|
| 3,847,978 | A | 11/1974 | Sianesi et al. |
| 4,777,224 | A | 10/1988 | Gorzynski et al. |
| 4,956,438 | A | 9/1990 | Ruetman et al. |
| 5,026,814 | A * | 6/1991 | Re .................. C08G 18/10 |
| | | | 428/844.7 |
| 5,032,666 | A | 7/1991 | Hu et al. |
| 5,084,315 | A | 1/1992 | Karimi et al. |
| 5,189,135 | A | 2/1993 | Cozzi et al. |
| 5,290,418 | A | 3/1994 | Menchen et al. |
| 5,332,798 | A | 7/1994 | Ferreri et al. |
| 5,589,552 | A | 12/1996 | Simeone et al. |
| 5,798,415 | A | 8/1998 | Corpart et al. |
| 6,071,564 | A | 6/2000 | Marchetti et al. |
| 6,579,835 | B2 | 6/2003 | Scicchitano et al. |
| 6,926,937 | B2 | 8/2005 | Extrand et al. |
| 6,992,132 | B2 | 1/2006 | Trombetta et al. |
| 7,655,310 | B2 | 2/2010 | Trombetta |
| 9,136,562 | B2 | 9/2015 | Singh et al. |
| 2002/0016267 | A1 | 2/2002 | Scicchitano et al. |
| 2003/0229176 | A1 | 12/2003 | Trombetta et al. |
| 2004/0019143 | A1 | 1/2004 | Koloski et al. |
| 2005/0164010 | A1 | 7/2005 | Trombetta |
| 2006/0189750 | A1 | 8/2006 | Maier et al. |
| 2007/0298216 | A1 | 12/2007 | Jing et al. |
| 2008/0219944 | A1 | 9/2008 | Longo et al. |
| 2010/0324205 | A1 | 12/2010 | Maier et al. |
| 2011/0177987 | A1 | 7/2011 | Lenting et al. |
| 2011/0218290 | A1 | 9/2011 | Webster et al. |
| 2011/0229750 | A1 | 9/2011 | McLellan et al. |
| 2011/0213085 | A1 | 11/2011 | Tonelli et al. |
| 2012/0136120 | A1 | 2/2012 | Bosman |
| 2012/0164565 | A1 | 6/2012 | Qiu |
| 2014/0113144 | A1 | 4/2014 | Loth et al. |
| 2014/0127516 | A1 | 5/2014 | Wang et al. |
| 2014/0162022 | A1 | 6/2014 | Nowak et al. |
| 2015/0158969 | A1 | 6/2015 | Nowak |
| 2015/0329453 | A1 | 11/2015 | Guarda et al. |
| 2016/0009971 | A1 * | 1/2016 | Wang .................. C08G 18/246 |
| | | | 428/314.4 |
| 2016/0028114 | A1 | 1/2016 | Pratt et al. |
| 2016/0201005 | A1 | 7/2016 | Nowak et al. |

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).
Siochi et al., "Engineered Surfaces for Mitigation of Insect Residue Adhesion" NF1676L-15481 SAMPE 2013; May 6-9, 2013; Long Beach, CA; United States.
Wohl et al., "Evaluation of commercially available materials to mitigate insect residue adhesion on wing leading edge surfaces," Progress in Organic Coatings 76 (2013) 42-50.
Kok et al., "Influence of surface characteristics on insect residue adhesion to aircraft leading edge surfaces," Progress in Organic Coatings 76 (2013) 1567-1575.
Lee et al., "Zwitter-Wettability and Antifogging Coatings with Frost-Resisting Capabilities," ACS Nano 7 (2013) 2172-2185.
Chen et al., "Robust Prototypical Anti-icing Coatings with a Self-lubricating Liquid Water Layer between Ice and Substrate," ACS Appl. Mater. Interfaces 5 (2013) 4026-4030.
Turri et al., "Waterborne Anionomeric Polyurethane-Ureas from Functionalized Fluoropolyethers," Journal of Applied Polymer Science, vol. 93, 136-144 (2004).
Dou et al., "Anti-icing Coating with an Aqueous Lubricating Layer," ACS Appl. Mater. Interfaces 2014, 6, 6998-7003.
Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.
Chen et al., "A Thermally Re-mendable Cross-Linked Polymeric Material," Science 295 (5560), 1698-1702, Mar. 1, 2002.
Oster et al., "Photoreduction of Metal Ions by Visible Light," Departmenotf Chemistry, Polytechnic Institute of Brooklyn, 135th National meeting of the American Chemical Society, Nov. 5, 1959.
Wojtecki et al., "Using the dynamic bond to access macroscopically responsive structurally dynamic polymers," Nature Materials vol. 10, Jan. 2011.
Castellano et al., "Fluoro-modified elastomeric polyurethanes: effects of synthesis procedure on properties and morphology" J Mater Sci (2014) 49:2519-2533.

* cited by examiner 310   320

| Example | AMIL Ice Adhesion Reduction Factor |
|---|---|
| Aluminum Control | ≡ 1.0 |
| 1 | 1363 ± 41 |
| 3 | 36 ± 6 |
| 4 | 157 ± 25 |
| 5 | 108 ± 18 |
| 6 | 153 ± 61 |
| 9 | 10.5 |

COMPOSITIONS FOR FABRICATING DURABLE, LOW-ICE-ADHESION COATINGS

PRIORITY DATA

This patent application is a non-provisional application claiming priority to U.S. Provisional Patent App. No. 62/624,226, filed on Jan. 31, 2018, which is hereby incorporated by reference herein. This patent application is also a continuation-in-part of U.S. patent application Ser. No. 15/608,975, filed on May 30, 2017, which in turn is a continuation-in-part of U.S. patent application Ser. No. 14/829,640, filed on Aug. 19, 2015, each of which is hereby incorporated by reference herein.

FIELD OF THE INVENTION

The present invention generally relates to low-ice-adhesion coatings.

BACKGROUND OF THE INVENTION

Coatings and materials can become soiled from debris (particles, insects, oils, etc.) impacting the surface as well as ice forming on the surface. The debris and ice affects airflow over the surface.

In aviation, icing conditions are those atmospheric conditions that can lead to the formation of water ice on the surfaces of an aircraft, or within the engine as carburetor icing. Inlet icing is another engine-related danger, often occurring in jet aircraft. Icing conditions exist when the air contains droplets of supercooled liquid water. The wing will ordinarily stall at a lower angle of attack, and thus a higher airspeed, when contaminated with ice.

If ice is present on an aircraft prior to takeoff, the ice must be removed from critical surfaces. Removal can take many forms, including mechanical means, deicing fluids, hot water, or infrared heating. These techniques may remove existing contamination, but provide no practical protection in airborne icing conditions. Deicing fluids may resist the effects of snow and rain for some time but are intended to shear off the aircraft during takeoff and therefore provide no inflight protection.

To protect an aircraft against icing in-flight, various forms of anti-icing or deicing are used. Some aircraft are equipped with pneumatic deicing boots that disperse ice build-up on the surface. A weeping wing system may be used, with many small holes that release anti-icing fluid on demand to prevent the buildup of ice. Electrical heating may be used to protect aircraft and components (including propellers) against icing. Modern commercial aircraft often employ a hollow tube located behind the leading edge of the wing, through which hot engine bleed air is directed to melt and release ice.

Passive, durable anti-icing coatings have been identified as a need in the aerospace field for many decades. However, previous solutions lacked a required level of performance in ice adhesion reduction, adequate long-term durability, or both of these. Some of the most-effective coatings for reducing ice adhesion are dependent on sacrificial oils or greases that have limited useful lifetimes and require regular reapplication. Currently, durable coatings for exposed areas on fixed wing and rotorcraft (such as the leading edge of the wing or rotorblade) include thermoplastic elastomers bonded to the vehicle surface using a film adhesive or an activated adhesive backing incorporated into the coating itself. However, the prior compositions do not provide any benefit in lowering ice adhesion.

There remains a desire for coatings on aircraft exteriors (and other aerospace-relevant surfaces) in order to passively suppress the growth of ice near strategic points on the vehicle—such as the rotorblade edge, wing leading edge, or engine inlet. There also exists a need for high-performance coating materials fabricated in a way that preserves coating function during actual use of aerospace structures.

Low-ice-adhesion coatings are certainly not limited to aerospace-relevant surfaces. Other potential applications would include wind turbine blades, automobiles, trucks, trains, ocean-going vessels, electrical power transmission lines, buildings, windows, antennas, filters, instruments, sensors, cameras, satellites, weapon systems, and chemical plant infrastructure (e.g., distillation columns and heat exchangers).

In view of the shortcomings in the art, improved low-ice-adhesion coating materials and systems, and compositions suitable for these systems, are needed.

SUMMARY OF THE INVENTION

The present invention addresses the aforementioned needs in the art, as will now be summarized and then further described in detail below.

Some variations provide a low-ice-adhesion composition comprising a composite material containing at least a first-material phase and a second-material phase that is chemically distinct from the first-material phase, wherein the first-material phase and the second-material phase are nanophase-separated on an average nanophase-separation length scale from about 10 nanometers to less than 100 nanometers, wherein the first-material phase and the second-material phase further are microphase-separated on an average microphase-separation length scale that is from about 0.1 microns to about 100 microns and is hierarchically distinct from the nanophase-separation length scale, and wherein the composite material has a glass-transition temperature above $-80°$ C.

The nanophase separation may be caused, at least in part, by the presence of a third-material phase between the first-material phase and the second-material phase. One example is a segmented copolymer in which first soft segments are the first-material phase, second soft segments are the second-material phase, and hard segments are the third-material phase.

In some embodiments, the average microphase-separation length scale is from about 0.5 microns to about 75 microns, or from about 1 micron to about 50 microns, for example.

In some embodiments, the composite material has a glass-transition temperature above $-60°$ C. or above $-30°$ C. In some embodiments, both of the first-material phase and the second-material phase have a glass-transition temperature below the glass-transition temperature of the composite material.

The glass-transition temperature of the composite material may be about, or at least about, $-75°$ C., $-70°$ C., $-65°$ C., $-60°$ C., $-55°$ C., $-50°$ C., $-40°$ C., $-30°$ C., $-20°$ C., $-10°$ C., $0°$ C., $10°$ C., $20°$ C., $30°$ C., $40°$ C., or $50°$ C. In various embodiments, the glass-transition temperature of the composite material is less than about $20°$ C., $0°$ C., or $-20°$ C.

In some embodiments, one of the first-material phase and the second-material phase is hydrophobic, and the other is hydrophilic.

In some embodiments, one of the first-material phase and the second-material phase is omniphobic, and the other is hydrophilic.

In some embodiments, one of the first-material phase and the second-material phase is hydrophobic, and the other is hygroscopic. The hygroscopic phase may include poly(ethylene glycol), for example.

The first-material phase and the second-material phase typically have different surface energies. In some embodiments, one of the first-material phase and the second-material phase is hygroscopic, and the other comprises a low-surface-energy polymer having a surface energy between about 5 mJ/m$^2$ to about 50 mJ/m$^2$. An exemplary low-surface-energy polymer is a fluoropolymer, such as a fluoropolymer selected from the group consisting of polyfluoroethers, perfluoropolyethers, polyfluoroacrylates, polyfluorosiloxanes, polytetrafluoroethylene, polyvinylidene difluoride, polyvinylfluoride, polychlorotrifluoroethylene, copolymers of ethylene and trifluoroethylene, copolymers of ethylene and chlorotrifluoroethylene, and combinations thereof.

In embodiments in which the composite material is a polymer, the first-material phase and the second-material phase may be connected by polymer chain extension and/or polymer crosslinking. In some embodiments, the first-material phase and the second-material phase are covalently connected in a block copolymer, such as a segmented urethane/urea block copolymer.

In certain embodiments, the block copolymer is a segmented copolymer composition comprising:

(a) one or more first soft segments selected from fluoropolymers having an average molecular weight from about 500 g/mol to about 10,000 g/mol, wherein the fluoropolymers are ($\alpha,\omega$)-hydroxyl-terminated and/or ($\alpha,\omega$)-amine-terminated;

(b) one or more second soft segments selected from polyesters or polyethers, wherein the polyesters or polyethers are ($\alpha,\omega$)-hydroxyl-terminated and/or ($\alpha,\omega$)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof.

In certain embodiments, the fluoropolymers include a fluoropolymer having the structure:

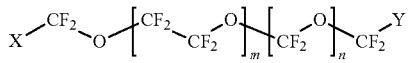

wherein:
X, Y=CH$_2$—(O—CH$_2$—CH$_2$)$_p$—OH wherein p=0 to 50 and wherein X and Y are independently selected;
m=1 to 100; and
n=0 to 100, or 1 to 100.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

The low-ice-adhesion composition may be present in a coating or in another type of material or object.

Other variations provide a segmented copolymer composition comprising:

(a) one or more first soft segments selected from fluoropolymers having an average molecular weight from about 500 g/mol to about 10,000 g/mol, wherein the fluoropolymers contain an oxygen atom connected to two alkyl or aryl groups, wherein at least one hydrogen atom of the alkyl or aryl group is replaced by a fluorine atom, and wherein the fluoropolymers are ($\alpha,\omega$)-hydroxyl-terminated and/or ($\alpha,\omega$)-amine-terminated;

(b) one or more second soft segments selected from polyesters or polyethers, wherein the polyesters or polyethers are selected from the group consisting of poly(oxymethylene), poly(ethylene glycol), poly(propylene glycol), poly(glycolic acid), poly(caprolactone), poly(ethylene adipate), poly(hydroxybutyrate), poly(hydroxyalkanoate), and combinations thereof, and wherein the polyesters or polyethers are ($\alpha,\omega$)-hydroxyl-terminated and/or ($\alpha,\omega$)-amine-terminated;

(c) one or more hard segments containing a reacted form of one or more isocyanate species possessing an isocyanate functionality of 2 or greater; and (d) in the hard segments, a reacted form of one or more polyol or polyamine chain extenders or crosslinkers, wherein the first soft segments and the second soft segments are microphase-separated on an average microphase-separation length scale that is from about 0.1 microns to about 100 microns, and wherein the segmented copolymer composition has a glass-transition temperature above −80° C.

In some embodiments, the segmented copolymer composition has a glass-transition temperature above −60° C.

In some embodiments, the first soft segments and the hard segments are nanophase-separated on an average nanophase-separation length scale from about 10 nanometers to less than 100 nanometers. In these or other embodiments, the second soft segments and the hard segments are nanophase-separated on an average nanophase-separation length scale from about 10 nanometers to less than 100 nanometers.

In some embodiments, the molar ratio of the second soft segments to the first soft segments is less than 2.0.

The fluoropolymers may be selected from the group consisting of perfluoropolyethers, polyfluoroacrylates, polyfluorosiloxanes, and combinations thereof. In some embodiments, the fluoropolymers include a fluoropolymer having the structure:

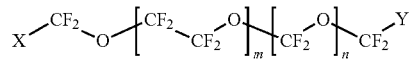

wherein:
X, Y=CH$_2$—(O—CH$_2$—CH$_2$)$_p$—OH wherein p=0 to 50 and wherein X and Y are independently selected;
m=1 to 100; and
n=0 to 100, or 1 to 100.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

At least one of the one or more polyol or polyamine chain extenders or crosslinkers may possess a functionality of 2, 3, or greater.

In some embodiments, at least one of the one or more polyol or polyamine chain extenders or crosslinkers is selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl)ethylenediamine, and homologues, derivatives, or combinations thereof.

The hard segment may be present in an amount from about 5 wt % to about 60 wt %, based on total weight of the composition.

The copolymer composition may be present in a coating or in another type of material or object.

Other variations provide a method of forming a low-ice-adhesion composition, the method comprising:
  (a) obtaining a hardenable precursor material for a low-ice-adhesion composition, the hardenable precursor material comprising a first component and a second component, wherein the first component may be a low-surface-energy polymer having a surface energy between about 5 mJ/m$^2$ to about 50 mJ/m$^2$, and the second component may be a hygroscopic material;
  (b) applying the hardenable precursor material to a substrate surface; and
  (c) curing the hardenable precursor material to form a low-ice-adhesion composition comprising a hardened continuous matrix that is both nanophase-separated and microphase-separated, i.e. the hardened continuous matrix is a composite material containing at least a first-material phase and a second-material phase that is chemically distinct from the first-material phase, wherein the first-material phase and the second-material phase are nanophase-separated on an average nanophase-separation length scale from about 10 nanometers to less than 100 nanometers, wherein the first-material phase and the second-material phase further are microphase-separated on an average microphase-separation length scale that is from about 0.1 microns to about 100 microns and is hierarchically distinct from the nanophase-separation length scale, and wherein the composite material has a glass-transition temperature above −80° C.

Other variations provide a method of forming a low-ice-adhesion composition, the method comprising:
  (a) obtaining a low-ice-adhesion material comprising:
    a composite material containing at least a first-material phase and a second-material phase that is chemically distinct from the first-material phase, wherein the first-material phase and the second-material phase are nanophase-separated on an average nanophase-separation length scale from about 10 nanometers to less than 100 nanometers, wherein the first-material phase and the second-material phase further are microphase-separated on an average microphase-separation length scale that is from about 0.1 microns to about 100 microns and is hierarchically distinct from the nanophase-separation length scale, and wherein the composite material has a glass-transition temperature above −80° C.; and
  (b) applying the low-ice-adhesion material to a substrate surface, thereby forming a composition containing the low-ice-adhesion material.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 5 shows a table of AMIL Ice Adhesion Reduction Factor data for the samples described in Examples 1, 2, 3, 4, 5, and 8.

DETAILED DESCRIPTION OF EMBODIMENTS OF THE INVENTION

Figure 1:
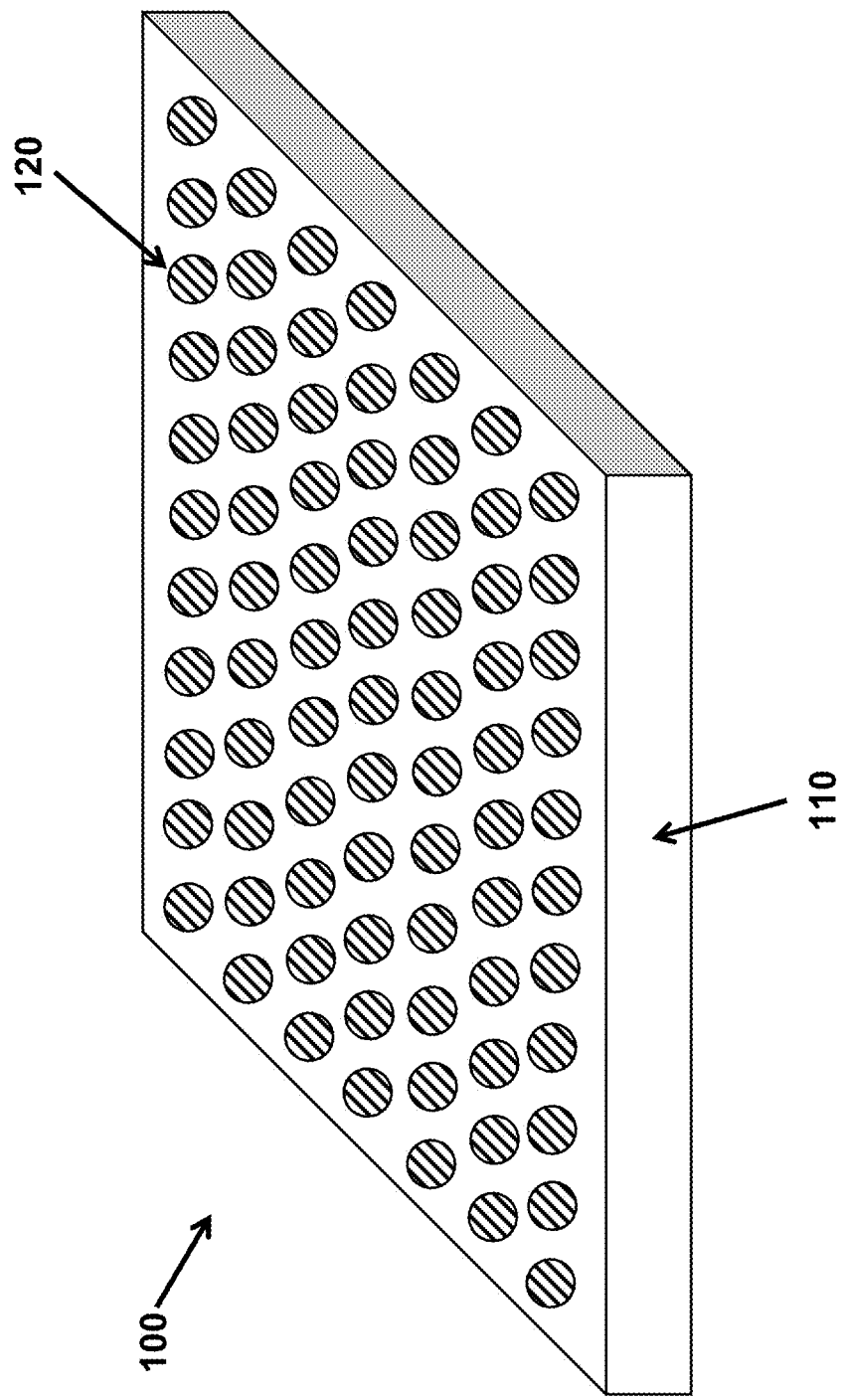
FIG. 1 depicts the structure of a coating or surface with low-ice-adhesion properties, in some embodiments.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of the invention provide compositions for low-ice-adhesion coatings. A "low-ice-adhesion" material, coating, or film is defined as a material, coating, or film that is characterized by an AMIL Centrifuge Ice Adhesion Reduction Factor of greater than 1, preferably greater than 5, more preferably 10 or more, and most preferably 25 or more. The definition with test procedure for the AMIL Centrifuge Ice Adhesion Reduction Factor is described in the Examples section below.

Some variations of this invention are premised on the discovery of a material that possesses both low surface energy (for low adhesion) and the ability to absorb water. A structured material or coating, as disclosed, may passively absorb water from the atmosphere and then expel this water to create a lubrication/self-cleaning layer. Because these materials trap a layer of water near the surface, they can delay the formation of ice. The coating in some embodiments may thus be characterized as "icephobic," which is intended to mean the coating is capable of delaying the formation of ice and/or causing a freezing-point depression of ice, compared to a bare substrate. The lubricating component has the ability to trap and organize a layer of water at the surface to both inhibit freezing and reduce adhesion forces in ice that does begin to accumulate on the surface.

Thermoplastic compositions set forth herein have been found to significantly delay the freezing of ice. Quantitative data is included in the Examples herein. In particular, quantitative test data show unprecedented performance of ice-adhesion reduction across a range of compositions. The disclosed coatings in some embodiments are composed of a 100% solid composition (no oils/greases/liquids) while showing excellent (up to 10-100×) reduction in ice adhesion over the state-of-the-art solid coatings. Such technology and performance represents a genuine path toward solving the aforementioned long-standing problems in the art.

In some variations, low-ice-adhesion structures are created by an inhomogeneous microstructure comprising a low-surface-energy polymer that is interspersed with hygroscopic domains (lubricating inclusions). Some embodiments utilize polymeric coating compositions containing at least two phases that microphase-separate microscopic length scales. In some embodiments, the low-ice-adhesion material contains a segmented urethane/urea copolymer composition that includes a fluoropolymer, a polyether, and a polyurethane.

Unless otherwise indicated, all references to "phases" in this patent application are in reference to solid phases. The solid phases are typically polymeric and may melt or at least undergo a glass transition at elevated temperatures. Reference to multiple solid phases in a composition or microstructure means that there are at least two distinct chemical phases that are solid, without forming a solid solution or homogeneous mixture.

The microphase-separated microstructure containing the first-material phase and second-second phase may be characterized as an inhomogeneous microstructure. As intended in this patent application, "phase inhomogeneity," "inhomogeneous microstructure," and the like mean that a multiphase microstructure is present in which there are at least two discrete phases that are separated from each other. The two phases may be one discrete solid phase in a continuous solid phase, two co-continuous solid phases, or two discrete solid phases in a third continuous solid phase, for example. The length scale of phase inhomogeneity may refer to the average size (e.g., effective diameter) of discrete inclusions of one phase dispersed in a continuous phase. The length scale of phase inhomogeneity may refer to the average center-to-center distance between nearest-neighbor inclusions of the same phase. The length scale of phase inhomogeneity may alternatively refer to the average separation distance between nearest-neighbor regions of the discrete (e.g., droplets) phase, where the distance traverses the continuous phase.

The average length scale of phase inhomogeneity may generally be from about 0.1 microns to about 500 microns, which in this disclosure is also referred to as "microphase separation." In some embodiments, the average length scale of phase inhomogeneity is from about 0.1 microns to about 100 microns, such as about 0.5 micron to about 50 microns. In various embodiments, the average length scale of phase inhomogeneity is about 0.1, 0.2, 0.3, 0.4, 0.5, 0.6, 0.7, 0.8, 0.9, 1, 2, 3, 4, 5, 10, 15, 20, 25, 30, 35, 40, 45, 50, 60, 70, 80, 90, 100, 150, 200, 250, 300, 350, 400, 450, or 500 microns, including any intermediate values not explicitly recited, and ranges starting, ending, or encompassing such intermediate values. These are average values, noting that a portion of phase inhomogeneity may be present on a length scale less than 0.1 micron or greater than 500 microns (e.g., about 1000 microns), with the overall average falling in the range of 0.1-500 microns or 0.1-100 microns. (Note that in this disclosure, "about 0.1 microns" is intended to encompass 50-149 nanometers, i.e. ordinary rounding.)

Exemplary imaging techniques to measure microphase separation include, but are not limited to, confocal laser scanning microscopy, scanning electron microscopy, scanning tunneling microscopy, and atomic force microscopy.

This phase inhomogeneity typically causes opaque coatings or films due to the scattering of light. Scattering of light including visible wavelengths in the bulk of a material is governed by changes in the index of refraction through the medium. Variations in refractive index at length scales near the wavelength of the propagating radiation will tend to scatter those wavelengths more effectively (Mie scattering), resulting in an opaque or white appearance for a coating.

With visible light having a wavelength range of about 400-700 nm, a clear or transparent coating must typically keep variations in index of refraction below about 50 nm in length. As phase inhomogeneities increase in length scale, the opacity of the material rises. Phase inhomogeneities with average length scales of at least 0.1 µm are expected to drive significant scattering in the material, leading to opaque structures above 25 µm in thickness—unless the multiple phases happen to be refractive index-matched. See Althues et al., "Functional inorganic nanofillers for transparent polymers", *Chem. Soc. Rev.*, 2007, 36, 1454-1465, which is hereby incorporated by reference herein for its teaching that materials with inhomogeneity below 50 nm will tend to be clear, and materials with inhomogeneity above 50 nm (0.05 µm) will tend to be more opaque.

In preferred embodiments, two solid materials are microphase-separated on a length scale from about 0.1 microns to about 100 microns. Therefore, these compositions tend to be non-transparent—unless there happens to be refractive index matching of the first solid material and second solid material (and absorbed liquid when in a significant concentration). In some embodiments, the composition is opaque with respect to ordinary light. In certain embodiments, the composition is semi-transparent or transparent with respect to ordinary light.

The composition may also be characterized by hierarchical phase separation. For example, the first solid material and the second solid material, in addition to being microphase-separated, are typically nanophase-separated. As intended herein, two materials being "nanophase-separated" means that the two materials are separated from each other on a length scale from about 1 nanometer to less than 100 nanometers. For example, the nanophase-separation length scale may be from about 10 nanometers to about 90 nanometers.

The nanophase separation between first solid material (or phase) and second solid material (or phase) may be caused by the presence of a third solid material (or phase) disposed between regions of the first and second solid materials. For example, in the case of first and second solid materials being soft segments of a segmented copolymer also with hard segments, the nanophase separation may be driven by intermolecular association of hydrogen-bonded, dense hard segments. In these cases, in some embodiments, the first soft segments and the hard segments are nanophase-separated on an average nanophase-separation length scale from about 10 nanometers to less than 100 nanometers. Alternatively, or additionally, the second soft segments and the hard segments may be nanophase-separated on an average nanophase-separation length scale from about 10 nanometers to less than 100 nanometers. The first and second soft segments themselves may also be nanophase-separated on an average nanophase-separation length scale from about 10 nanometers to less than 100 nanometers, i.e., the length scale of the individual polymer molecules.

The nanophase-separation length scale is hierarchically distinct from the microphase-separation length scale. With traditional phase separation in block copolymers, the blocks chemically segregate at the molecular level, resulting in regions of segregation on the length scale of the molecules, such as a nanophase-separation length scale from about 10 nanometers to about 100 nanometers. See Petrovic et al., "Polyurethane Elastomers" *Prog Polym Sci*, Vol. 16, 695-836, 1991 and Lohse et al., "Microphase separation in block copolymers" *Current Opinion in Colloid & Interface Science*, Vol. 2, Issue 2, 171-176, 1997, which are each hereby incorporated by reference herein, for their teachings regarding nanophase separation in copolymers. Note that in this disclosure, nanophase separation is synonymous with "molecular-level segregation."

Hierarchical phase separation (i.e., microphase separation plus nanophase separation) results from the process to make the composition. The extreme difference of the two soft segments means that in the reaction pot the soft segments do not mix homogeneously and so create discrete region that are rich in fluoropolymer or rich in non-fluoropolymer, e.g., poly(ethylene glycol) (referred to herein as "PEG") components, distinct from the molecular-level segregation. These emulsion droplets contain a large amount of polymer chains and are thus in the micron length-scale range. These length scales survive the curing process, so that the final material contains the microphase separation that was set-up from the emulsion, in addition to the molecular-level segregation. Chen et al., "Structure and morphology of segmented polyurethanes: 2. Influence of reactant incompatibility," *POLYMER* 1983, Vol. 24, pages 1333-1340, is hereby incorporated by reference herein for its teachings about microphase separation that can arise from an emulsion-based procedure.

The mechanism that creates the microphase separation is now understood to be related to an oil-in-water style phase separation of immiscible components during synthesis and film casting. The multiple components can flow and separate, analogous to an oil-water emulsion, and the microphase separation is locked into place upon curing. The nanophase separation, at a smaller length scale than the microphase separation, arises from organization of the block copolymer at the molecular level.

The microphase separation is not directly related to the individual blocks segregating at the molecular level, but rather is driven by an emulsification process occurring between dissimilar materials in the reaction pot. For example, in some embodiments, PFPE and PEG flow and separate under shear to create PFPE-rich and PEG-rich rich droplets or regions. During synthesis, under the action of a mechanical stirrer, shear forces reduce droplets to the micron (0.1-100 micron) length scale range. When these precursors are combined with a curative and sprayed down on a surface using a carrier solvent, the PFPE-rich and PEG-rich droplets begin to coalesce as the solvent evaporates and the curative increases molecular weight of the system, causing it to gel. The final result is a discrete phase and a continuous phase at the 0.1-100 micron length scale.

In some embodiments, the nanophase separation is on the length scale of domains that include (1) a fluid-resistant, chemically inert, hydrophobic first soft segment; (2) a hygroscopic (water-absorbing) and/or liquid-swellable second soft segment; and (3) a rigid, highly associated hard segment that provides network reinforcement and stability. In a composition possessing hierarchical phase separation, a first microphase may contain nanophases of (1) along with nanophases of (3), while a second microphase may contain nanophases of (2) along with nanophases of (3). Without being limited by speculation, it is believed that in the CLSM images of FIGS. 2A, 2B, 3A, 3B, 3C, 3D, 4A, and 4B, the dark regions are microphases that contain hydrophobic first soft segments and highly associated hard segments, each being nanophase-separated; and the light regions are microphases that contain hygroscopic second soft segments and highly associated hard segments, also each being nanophase-separated.

Some variations provide a low-ice-adhesion composition comprising a composite material containing at least a first-material phase and a second-material phase that is chemically distinct from the first-material phase, wherein the first-material phase and the second-material phase are nanophase-separated on an average nanophase-separation length scale from about 10 nanometers to less than 100 nanometers, wherein the first-material phase and the second-material phase further are microphase-separated on an average microphase-separation length scale that is from about 0.1 microns to about 100 microns and is hierarchically distinct from the nanophase-separation length scale, and wherein the composite material optionally has a glass-transition temperature above −80° C. (193.15 K).

A wide range of concentrations of components may be present in the low-ice-adhesion composition. For example, the first-material phase may be from about 1 wt % to about 95 wt %, such as from about 10 wt % to about 50 wt % of the composite material. The second-material phase may be from about 1 wt % to about 95 wt %, such as from about 10 wt % to about 50 wt % of the composite material.

Within the component containing the first-material phase, the first-material phase may be from about 50 wt % to 100 wt %, such as about 60, 70, 80, 90, 95, or 100 wt %. Within the component containing the second-material phase, the second-material phase may be from about 50 wt % to 100 wt %, such as about 60, 70, 80, 90, 95, or 100 wt %.

In some embodiments, the average microphase-separation length scale is from about 0.5 microns to about 75 microns, or from about 1 micron to about 50 microns, for example. In various embodiments, the average microphase-separation length scale is about, or at least about, 0.1, 0.2, 0.5, 1, 2, 5, 10, 20, 30, 40, 50, 60, 70, 80, 90, 100, 200, 300, 400, or 500 microns.

Figure 2A:
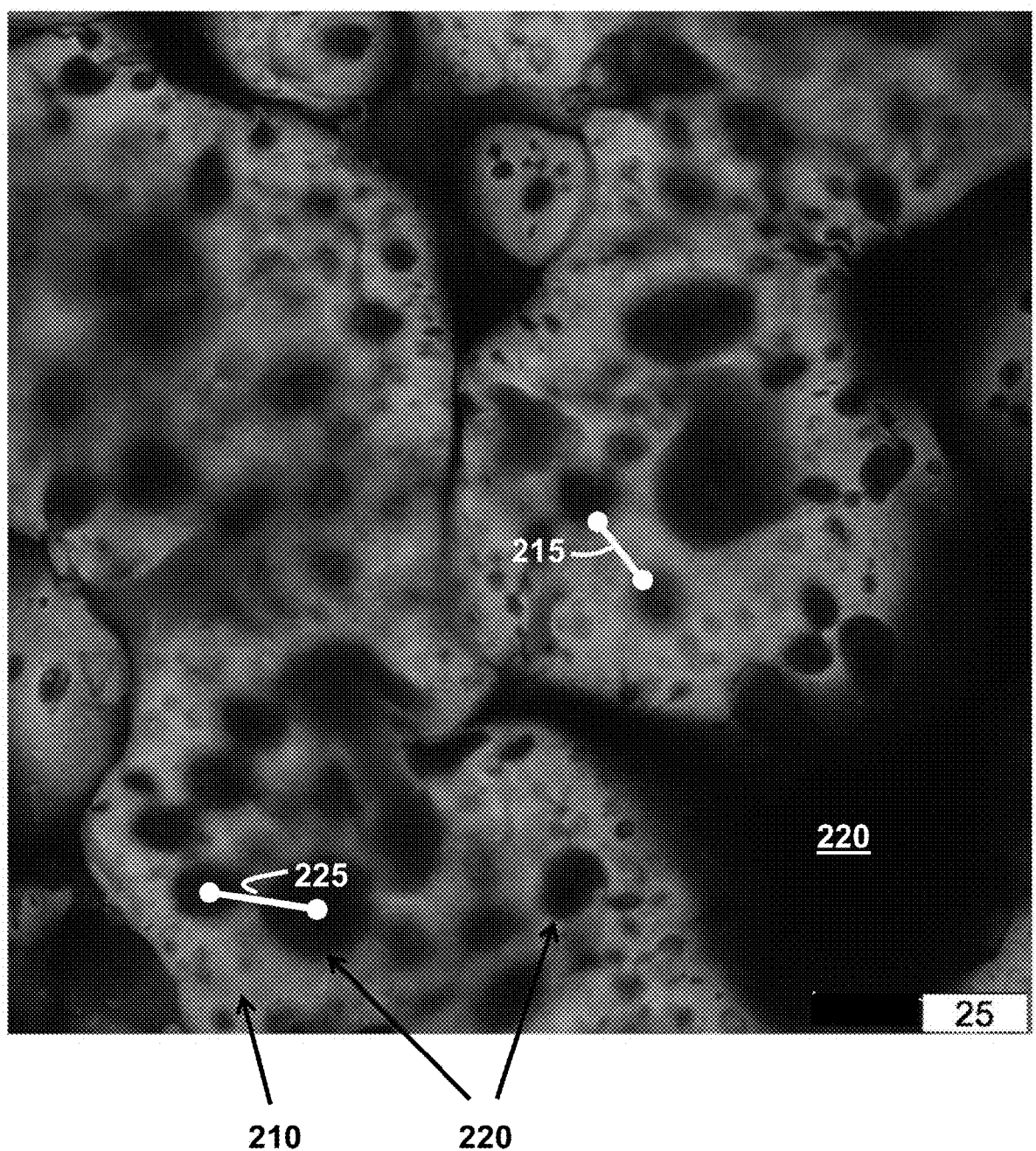
FIG. 2A shows a confocal laser scanning microscopy (CLSM) image for the coating of Example 5 (scale bar=25 μm).

FIG. 2A is an exemplary optical image (confocal laser scanning microscopy) depicting phase inhomogeneity, from Example 5, for purposes of illustration. The scale bar is 25 μm. The phase inhomogeneity can be characterized by a length scale associated with a discrete phase 220. For example, the length scale of phase inhomogeneity may refer to the average size (e.g., effective diameter) of discrete inclusions of one phase 220 dispersed in a continuous phase 210. The selected (for illustration) inclusions 220 labeled in FIG. 2A have an effective diameter of about 15-30 microns; generally the inclusions have an effective diameter of about 1 to 50 microns in this image. The length scale of phase inhomogeneity may refer to the average center-to-center distance 225 between nearest-neighbor inclusions of the same phase 220. In FIG. 2A, the selected center-to-center distance 225 is about 25 microns. The length scale of phase inhomogeneity may alternatively refer to the average separation distance 215 between nearest-neighbor regions of the discrete (e.g., droplets) phase 220, i.e. the size of the continuous phase 210 regions. In FIG. 2A, the selected separation distance 215 is about 20 microns. A range of particle sizes and separations is clearly present in this structure; the specific instances of features 210, 215, 220, and 225 were arbitrarily selected. The average length scale of phase inhomogeneity is in the range of 1 micron to 50 microns in FIG. 2A.

The average length scale of phase inhomogeneity (210, 215, 220, and/or 225) may generally be from about 0.1 microns to about 500 microns (microphase separation). In some embodiments, the average length scale of phase inhomogeneity (210, 215, 220, and/or 225) is from about 0.5 microns to about 100 microns, such as about 1 micron to about 50 microns. In various embodiments, the average length scale of phase inhomogeneity (210, 215, 220, and/or 225) is about 0.1, 0.2, 0.3, 0.4, 0.5, 0.6, 0.7, 0.8, 0.9, 1, 2, 3, 4, 5, 10, 15, 20, 25, 30, 35, 40, 45, 50, 60, 70, 80, 90, 100, 150, 200, 250, 300, 350, 400, 450, or 500 microns, including any intermediate values not explicitly recited, and ranges starting, ending, or encompassing such intermediate values. These are average values, noting that a portion of phase inhomogeneity (210, 215, 220, and/or 225) may be present on a length scale less than 0.1 micron or greater than 500 microns (e.g., about 1000 microns), with the overall average falling in the range of 0.1-500 microns or, in preferred embodiments, 0.1-100 microns.

Without being limited by theory, it is believed that the unique and quantifiable microstructure with phase inhomogeneity on the order of 0.1-500 microns, or in preferred embodiments on the order of 0.1-100 microns, drives low-ice-adhesion performance. It is further believed, without limitation, that the nanophase separation does not directly impact low-ice-adhesion performance, but may do so indirectly, such as due to a correlation between underlying base material properties (that impact ice adhesion) and nanophase separation between those base materials.

In some embodiments, the average nanophase-separation length scale is about, or at most about, 5, 10, 20, 30, 40, 50, 60, 70, 80, 90, 95, or 100 nanometers. Nanophase separation is only detectible with a suitable imaging technique. An imaging technique that cannot resolve features below 100 nanometers will not generally detect nanophase separation. Exemplary imaging techniques to measure nanophase separation include, but are not limited to, atomic force microscopy, high-resolution scanning electron microscopy, scanning tunneling microscopy, and nanoscale spectroscopy.

The atomic force microscopy (AFM) images of FIGS. 6A, 6B, and 6C, further discussed in Example 1 below, are illustrative of the presence of both microphase separation as well as nanophase separation. These figures are AFM height and phase scans of the Example 1 material. The AFM technique highlights the large (greater than 0.1 μm) microphase separation that is also observed using confocal laser scanning microscopy, as discussed above (with reference to FIG. 2A). The AFM technique is also able to resolve molecular (10-50 nm) features that are relevant to the nanophase separation found in many classic diblock copolymers and segmented copolymers (such as those described in Lohse).

The low-ice-adhesion coating may be characterized by a coating transparency of less than 70% average light transmission in the wavelength range of 400 nm to 700 nm, through a 1-millimeter-thick coating sample (defined test depth). In some embodiments, the low-ice-adhesion coating transparency is less than about 65%, 60%, 55%, 50%, 45%, 40%, 35%, 30%, 25%, 20%, 15%, or 10% average light transmission in the wavelength range of 400 nm to 700 nm, through a 1-millimeter-thick coating sample. As stated above, it is not technically necessary to have an opaque coating when providing a low-ice-adhesion coating. However, according to the principles of this disclosure, phase inhomogeneity on the order of 0.1-500 microns drives low-ice-adhesion performance; and such phase inhomogeneity, generally speaking, will cause more opaque coatings (e.g., less than 70% average light transmission through one mm of coating).

The glass-liquid transition, or glass transition, is the reversible transition in amorphous materials (or in amorphous regions within semicrystalline materials) from a hard and relatively brittle "glassy" state into a viscous or rubbery state as the temperature is increased. The glass-transition temperature $T_g$ of a material characterizes the range of temperatures over which this glass transition occurs. $T_g$ is always lower than the melting temperature, $T_m$, of the crystalline state of the material, if a melting temperature exists.

Despite the change in the physical properties of a material through its glass transition, the transition is not considered a phase transition; rather it is a phenomenon extending over a range of temperature and defined by one of several conventions. Upon cooling or heating through this glass-transition range, the material also exhibits a smooth step in the thermal-expansion coefficient and in the specific heat, with the location of these effects again being dependent on the history of the material. Glass is believed to exist in a kinetically locked state, and its entropy, density, and so on, depend on the thermal history. Therefore, the glass transition is primarily a dynamic phenomenon.

Different operational definitions of $T_g$ may be used. One definition refers to the viscosity, fixing $T_g$ when the material viscosity is $10^{12}$ Pa·s. In contrast to viscosity, the thermal expansion, heat capacity, shear modulus, and many other properties of glasses show a relatively sudden change at the glass-transition temperature. Any such step or kink can be used to define $T_g$. For example, one definition of $T_g$ uses the energy release on heating in differential scanning calorimetry. Typically, the sample is first cooled at $-10°$ C./min and then heated at $10°$ C./min. Another definition of $T_g$ uses the kink in thermal expansion. Here, heating rates of 3-5° C./min are common.

In polymers at or above their glass-transition temperature, molecular chains slide past each other when a force is applied. The introduction of relatively stiff chemical groups (such as benzene rings) will interfere with the flowing process and hence increase $T_g$. The stiffness of thermoplastics decreases due to this effect. Thus, a common definition of $T_g$ uses a kink in stiffness, measured by storage modulus. For example, the midpoint of a curve of storage modulus versus temperature, upon cooling, may be taken as an estimate of $T_g$ (e.g., see FIG. 7).

Figure 7:
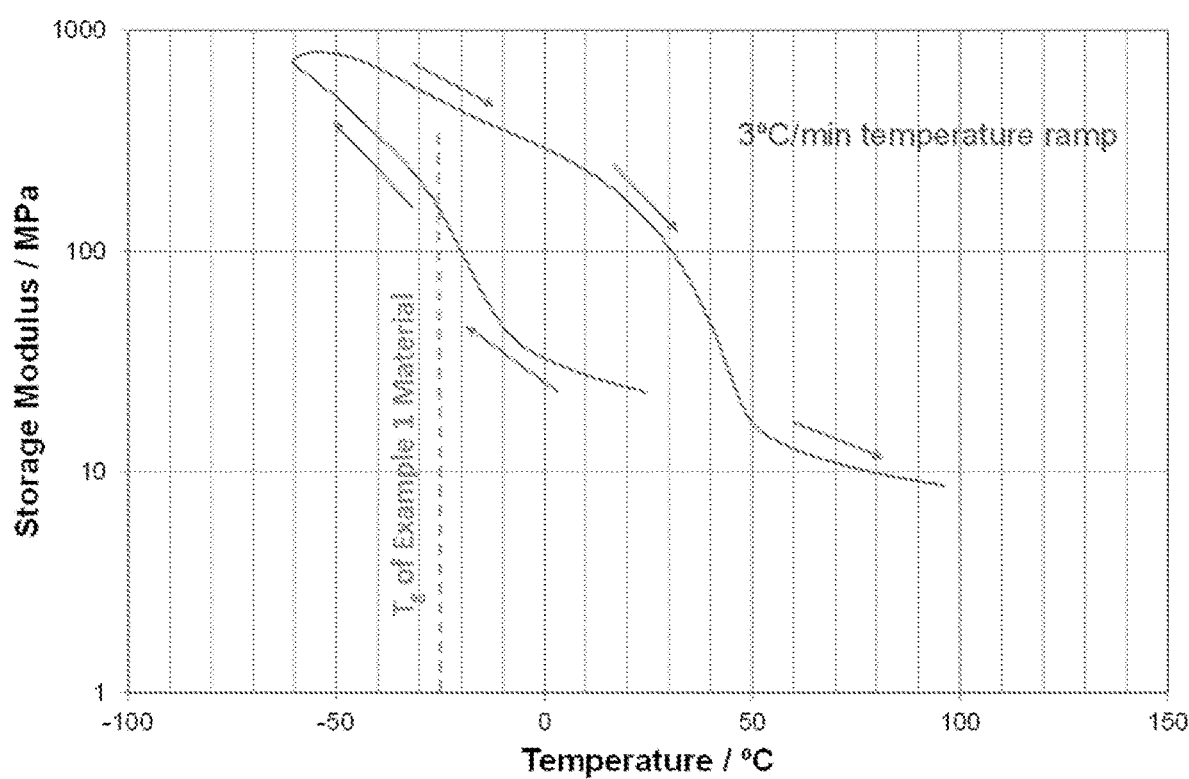
FIG. 7 is a Dynamic Mechanical Analyzer trace of the storage modulus versus temperature for the Example 1 material, indicating a glass-transition temperature of about −25° C.

While PFPE materials have glass-transition temperatures typically less than $-80°$ C. (U.S. Pat. No. 5,026,814 issued Jun. 25, 1991 to Re et al., which is incorporated by reference herein), composite materials combining PFPE and PEG, or many other soft segments, will display a $T_g$ considerably higher that $-80°$ C. For example, FIG. 7 is a Dynamic Mechanical Analyzer trace of the storage modulus versus temperature for the material of Example 1, indicating $T_g \approx -25°$ C. This glass-transition temperature is much higher than either of the individual soft-segment components, PFPE ($T_g = -90°$ C. to $-100°$ C.) and PEG ($T_g = -66°$ C.). This is due to the higher-$T_g$ PEG component as well as the modifying effect of the urethane/urea bonds (hard segments) between soft segments that produce a stiffening effect. In general, the composite material of the present invention may have a $T_g$ value that is intermediate between the $T_g$ of the two soft-segment components, or is higher than the $T_g$ of either of the two soft-segment components. The reason is that the hard segments themselves typically have high $T_g$ values, such as at least $0°$ C., at least $50°$ C., or at least $100°$ C.

In some embodiments, the first soft segments have an average glass-transition temperature from about $-150°$ C. to about $0°$ C., such as from about $-100°$ C. to about $-50°$ C. In these or other embodiments, the second soft segments have an average glass-transition temperature from about $-100°$ C. to about $50°$ C., such as from about $-75°$ C. to about $0°$ C. In any of these embodiments, the hard segments may have an average glass-transition temperature from about $-25°$ C. to about $250°$ C., such as from about $50°$ C. to about $150°$ C.

In some embodiments, the composite material has a glass-transition temperature above (a higher temperature than) $-60°$ C. or above $-30°$ C. The glass-transition temperature of the composite material may be about, or at least about, $-75°$ C., $-70°$ C., $-65°$ C., $-60°$ C., $-55°$ C., $-50°$ C., $-40°$ C., $-30°$ C., $-20°$ C., $-10°$ C., $0°$ C., $10°$ C., $20°$ C., $30°$ C., $40°$ C., or $50°$ C. In various embodiments, the glass-transition temperature of the composite material is less than about $20°$ C., less than about $0°$ C., or less than about $-20°$ C. In certain embodiments, the glass-transition temperature of the composite material is from about $-75°$ C. to about $25°$ C. In certain embodiments, the glass-transition temperature of the composite material is from about $-50°$ C. to about $0°$ C.

In certain embodiments, the coating is characterized by an AMIL Centrifuge Ice Adhesion Reduction Factor of about 100 or higher. In various embodiments, the coating is characterized by an AMIL Centrifuge Ice Adhesion Reduction Factor of about 2, 3, 4, 5, 6, 7, 8, 9, 10, 15, 20, 25, 30, 35, 40, 45, 50, 60, 70, 80, 90, 100, 110, 120, 130, 140, 150, 160, 170, 180, 190, 200 or higher. In preferred embodiments, the phase inhomogeneity of the microstructure results in low ice adhesion of a coating, characterized in that the coating, when subjected to an AMIL Centrifuge Ice Adhesion Test, generates an AMIL Centrifuge Ice Adhesion Reduction Factor of about 10 or more, more preferably about 25, 50, 75, 100 or more.

Note that the AMIL Centrifuge Ice Adhesion Reduction Factor is intrinsically tied to the physical microstructure at the surface as well as the chemical composition. The AMIL Centrifuge Ice Adhesion Reduction Factor is not a parameter that depends on intended use of the material, and it is not a functional limitation. Rather, the AMIL Centrifuge Ice Adhesion Reduction Factor is a defined, structural property of the material.

In some embodiments, the low-ice-adhesion coating or material is further characterized by a delay in the formation of ice of at least about 5 minutes at $-10°$ C.

In embodiments in which the composite material is a polymer, the first-material phase and the second-material phase may be connected by polymer chain extension and/or polymer crosslinking. In some embodiments, the first-material phase and the second-material phase are covalently connected in a block copolymer, such as a segmented urethane/urea block copolymer.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers. Segmented block copolymers are preferred, in some embodiments of the invention.

In some low-ice-adhesion coatings, one of the first-material phase and the second-material phase is hydrophobic, and the other is hydrophilic. In these or other embodiments, one of the first-material phase and the second-material phase is hydrophobic, and the other is hygroscopic. In these or other embodiments, one of the first-material phase and the second-material phase is hygroscopic, and the other comprises a low-surface-energy polymer having a surface energy between about 5 mJ/m$^2$ to about 50 mJ/m$^2$.

As intended in this patent application, "hygroscopic" means that the material is capable of attracting and holding water molecules from the surrounding environment. The water uptake of various polymers is described in This et al., "Water uptake of hydrophilic polymers determined by a thermal gravimetric analyzer with a controlled humidity chamber" *J. Mater. Chem.*, (17) 2007, 4864-4871, which is hereby incorporated by reference herein. In some embodiments, the hygroscopic material is characterized by a water absorption capacity, at 90% relative humidity and 30° C., of at least 5, 10, 15, 20, 25, 30, 35, 40, 45, or 50 wt % increase due to water uptake.

The low-ice-adhesion composition may be present in a coating or in another type of material or object. The micron-scale inhomogeneity exists throughout the material, in both planar and depth dimensions. That it, the low ice adhesion is not just a surface effect and will be present even if the coatings are eroded over time. The low-ice-adhesion function is retained even after abrasion (for whatever reason) of the top layer of the material.

Some variations of the present invention provide a low-ice-adhesion material comprising:
  a substantially continuous matrix containing a first component; and
  a plurality of discrete inclusions containing a second component, wherein the inclusions are dispersed within the matrix to form a phase-separated microstructure that is inhomogeneous on an average length scale of phase inhomogeneity from about 1 micron to about 100 microns,
  wherein one of the first component or the second component is a low-surface-energy polymer having a surface energy between about 5 mJ/m$^2$ to about 50 mJ/m$^2$, and the other of the first component or the second component is a hygroscopic material,
  wherein the continuous matrix and the inclusions form a material with a glass-transition temperature above −80° C.,
  and wherein the continuous matrix and the inclusions form a material surface that, in some embodiments, is characterized by an AMIL Centrifuge Ice Adhesion Reduction Factor of about 10 or more.

In some embodiments, the low-surface-energy polymer is a fluoropolymer, such as a fluoropolymer selected from the group consisting of polyfluoroethers, perfluoropolyethers, polyfluoroacrylates, polyfluorosiloxanes, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof. In certain embodiments, the fluoropolymer is not a polyfluorosiloxane.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The low-surface-energy polymer and the hygroscopic material may be covalently connected in a block copolymer. In these embodiments, the block copolymer may be a segmented copolymer composition comprising:
  (a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;
  (b) one or more second soft segments selected from polyesters or polyethers, wherein the polyesters or polyethers are optionally (α,ω)-hydroxyl-terminated and/or (α,ω)-amine-terminated;
  (c) one or more isocyanate species, or a reacted form thereof, possessing an isocyanate functionality of 2 or greater; and
  (d) one or more polyol or polyamine chain extenders or crosslinkers, or a reacted form thereof.

In specific embodiments, the fluoropolymers include a fluoropolymer having the structure:

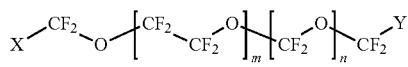

wherein:
X, Y=CH$_2$—(O—CH$_2$—CH$_2$)$_p$—OH wherein p=0 to 50 and wherein X and Y are independently selected;
m=1 to 100; and
n=0 to 100, or 1 to 100.

Note that the X group, the Y group, or both of these may alternatively be amine-terminated and/or thiol-terminated rather than hydroxyl-terminated.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

The low-ice-adhesion material optionally further includes one or more additional components selected from the group consisting of a particulate filler, a pigment, a dye, a plasticizer, a flame retardant, a flattening agent, and a substrate adhesion promoter. A particulate filler (when present) may be selected from the group consisting of silica, alumina, silicates, talc, aluminosilicates, barium sulfate, mica, diatomite, calcium carbonate, calcium sulfate, carbon, wollastonite, and combinations thereof. The particulate filler may be surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof. The particulate fillers are preferably in the size range of about 5 nm to about 2 µm, such as about 20 nm to 100 nm.

The structure of some variations of the invention is shown in FIG. 1. FIG. 1 depicts the structure of a coating or surface with low-ice-adhesion properties.

The structure 100 of FIG. 1 includes a continuous matrix 110. A "continuous matrix" (or equivalently, "substantially continuous matrix") means that the matrix material is present in a form that includes chemical bonds among molecules of the matrix material. An example of such chemical bonds is crosslinking bonds between polymer chains. In a substantially continuous matrix 110, there may be present various defects, cracks, broken bonds, impurities, additives, and so on. The structure 100 further includes a plurality of inclusions 120 (depicted as two-dimensional circles for illustration purposes only), intimately dispersed within the matrix 110. In some embodiments, each of the inclusions 120 are, or comprise, a hygroscopic material. In certain embodiments, the inclusions 120 are covalently bonded with the matrix 110 in a copolymer, such as the fluoropolymer copolymerized with poly(ethylene glycol).

Note that in FIG. 1, the functions of the continuous matrix 110 and discrete inclusions 120 may be reversed. That is, in some variations, the continuous matrix 110 may be hygroscopic, while the inclusions 120 may include a low-surface-energy polymer. An example of such a configuration is the structure of FIGS. 2A, 2B, and 2C, in which the continuous matrix 210 is hygroscopic and the inclusions 220 are hydrophobic. In the specific case of a fluoropolymer copolymer with poly(ethylene glycol), the PEG phase may be regarded as the matrix and the fluoropolymer phase may be regarded as the inclusions, depending on the magnitude of individual molecular weights in the copolymer.

Optionally, the continuous matrix 110 may further comprise one or more additives selected from the group consisting of fillers, colorants, UV absorbers, defoamers, plasticizers, viscosity modifiers, density modifiers, catalysts, and scavengers.

Preferred embodiments employ fluoropolymers, without limitation of the invention, as described in more detail below. A preferred technique to compatiblize fluoropolymers and hygroscopic materials is the use of segmented polyurethane or urea systems. These species demonstrate strong hydrogen bonding potential between them and as a result can create strong associative forces between the chains. In order to produce elastomeric materials, regions of highly flexible and weakly interacting chains (soft segments) must be incorporated with strongly associating elements (hard segments) and this can be provided in a segmented copolymerization scheme. Segmented copolymers provide a straightforward synthetic route toward block architectures using segments with vastly differing properties. Such synthesis results in chains that possess alternating hard and soft segments composed of regions of high urethane bond density and the chosen soft segment component (e.g., fluoropolymer or hygroscopic element), respectively. This covalent linkage of dissimilar hard and soft blocks drives the systems to phase separation and creates regions of flexible soft blocks surrounding regions of hard blocks. The associative forces among the hard segments prevent flow under stress and can produce elastomeric materials capable of displaying high elongation and tensile strength.

In a specific embodiment of the disclosure, there is provided a segmented copolymer composition. The composition comprises one or more $\alpha,\omega$ (alpha, omega)-amine-terminated or $\alpha,\omega$ (alpha, omega)-hydroxyl-terminated polyfluoropolymer first soft segments having an average molecular weight of between about 500 grams per mole to about 10,000 grams per mole. The exemplary composition further comprises one or more poly(ethylene glycol) second soft segments having an average molecular weight of between about 500 grams per mole to about 10,000 grams per mole. A total content of the one or more first soft segments and the one or more second soft segments is present in an amount of from about 40% by weight to about 90% by weight, based on a total weight percent of the composition. The composition further comprises one or more hard segments present in an amount of from about 10% by weight to about 50% by weight, based on the total weight percent of the composition. The one or more hard segments comprise a combination of one or more isocyanate species and one or more low-molecular-weight polyol or polyamine chain extenders or crosslinkers. Some compositions are characterized by a delay in the formation of ice on the surface and/or by a contact angle of water on the surface >90°.

Some variations provide a segmented copolymer composition comprising:

(a) one or more first soft segments selected from fluoropolymers having an average molecular weight from about 500 g/mol to about 10,000 g/mol, wherein the fluoropolymers contain an oxygen atom connected to two alkyl or aryl groups, wherein at least one hydrogen atom of the alkyl or aryl group is replaced by a fluorine atom, and wherein the fluoropolymers are $(\alpha,\omega)$-hydroxyl-terminated and/or $(\alpha,\omega)$-amine-terminated;

(b) one or more second soft segments selected from polyesters or polyethers, wherein the polyesters or polyethers are selected from the group consisting of poly(oxymethylene), poly(ethylene glycol), poly(propylene glycol), poly(glycolic acid), poly(caprolactone), poly(ethylene adipate), poly(hydroxybutyrate), poly(hydroxyalkanoate), and combinations thereof, and wherein the polyesters or polyethers are $(\alpha,\omega)$-hydroxyl-terminated and/or $(\alpha,\omega)$-amine-terminated;

(c) a hard segment containing a reacted form of one or more isocyanate species possessing an isocyanate functionality of 2 or greater; and (d) in the hard segment, a reacted form of one or more polyol or polyamine chain extenders or crosslinkers, wherein the first soft segments and the second soft segments are microphase-separated on an average microphase-separation length scale that is from about 0.1 microns to about 100 microns, wherein the segmented copolymer composition has a glass-transition temperature above −80° C., and wherein optionally the molar ratio of the second soft segments to the first soft segments is less than 2.0.

In some embodiments, the segmented copolymer composition has a glass-transition temperature above −60° C.

In some embodiments, the molar ratio of the second soft segments to the first soft segments is less than 2.0.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

At least one of the one or more polyol or polyamine chain extenders or crosslinkers may possess a functionality of 2, 3, or greater.

In some embodiments, at least one of the one or more polyol or polyamine chain extenders or crosslinkers is selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

The hard segment may be present in an amount from about 5 wt % to about 60 wt %, based on total weight of the composition.

It is noted that $(\alpha,\omega)$-terminated polymers are terminated at each end of the polymer. The $\alpha$-termination may be the same or different than the $\omega$-termination. Also it is noted that in this disclosure, "$(\alpha,\omega)$-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the molar ratio of the second soft segments to the first soft segments is from about 0.1 to about 1.5. In various embodiments, the molar ratio of the second soft segments to the first soft segments is about, at least about, or at most about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 2.5, 3.0, or greater), i.e. beyond diols or diamines.

The one or more chain extenders or crosslinkers (or reaction products thereof) may be present in a concentration, in the segmented copolymer composition, from about 0.01 wt % to about 25 wt %, such as about 0.05 wt % to about 10 wt %.

As meant herein, a "low-surface-energy polymer" means a polymer, or a polymer-containing material, with a surface energy of no greater than 50 mJ/m². The principles of the invention may be applied to low-surface-energy materials with a surface energy of no greater than 50 mJ/m², in general (i.e., not necessarily limited to polymers).

In some embodiments, the low-surface-energy polymer includes a fluoropolymer, such as (but not limited to) a fluoropolymer selected from the group consisting of polyfluoroethers, perfluoropolyethers, fluoroacrylates, fluorosilicones, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof.

In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the fluoropolymers are selected from the group consisting of perfluoropolyethers, polyfluoroacrylates, polyfluorosiloxanes, and combinations thereof. In certain embodiments, the fluoropolymers include a fluoropolymer segmented copolymer with poly(ethylene glycol) having the structure:

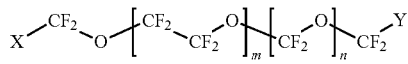

wherein:
X, Y=CH$_2$—(O—CH$_2$—CH$_2$)$_p$—OH wherein p=0 to 50 and wherein X and Y are independently selected;
m=1 to 100; and
n=1 to 100, or 0 to 100.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender or crosslinker may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof. In some embodiments, polymeric forms of polyol chain extenders or crosslinkers are utilized, typically hydrocarbon or acrylic backbones with hydroxyl groups distributed along the sidegroups. These crosslinkers typically possess a functionality of much greater than 2.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

The segmented copolymer composition may be present in a coating, for example. Such a coating may be characterized by a contact angle of water on a coating surface of greater than 90°. Such a coating may be characterized by an average kinetic delay of surface ice formation of at least 5 minutes at −10° C.

The low-ice-adhesion material may be characterized by a water absorption capacity of at least 10 wt % water based on total weight of the low-friction, low-adhesion material. The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

The low-ice-adhesion material may be characterized by a surface contact angle of water of greater than 90° (hydrophobic). The material may also be hydrophilic, i.e. characterized by an effective contact angle of water that is less than 90°. In various embodiments, the material is characterized by an effective contact angle of water of about 70°, 75°, 80°, 85°, 90°, 95°, 100°, or higher.

The low-ice-adhesion material may also be lipophobic or partially lipophobic in some embodiments. In various embodiments, the material is characterized by an effective contact angle of hexadecane (as a measure of lipophobicity) of about 30°, 40°, 50°, or higher.

The low-ice-adhesion material may simultaneously have hydrophobic and lipophobic properties. A low-ice-adhesion material may be "omniphobic," which means it is both lipophobic and hydrophobic. In certain embodiments, the material is characterized by an effective contact angle of water of at least 90° and simultaneously an effective contact angle of hexadecane of at least 60°. In certain embodiments, the material is characterized by an effective contact angle of water of at least 80° and simultaneously an effective contact angle of hexadecane of at least 70°.

In some embodiments, the material is characterized by a coefficient of friction, measured at 40-55% (e.g. 50%) relative humidity and room temperature, less than 1, 0.9, 0.8, 0.7, 0.6, 0.5, 0.4, or 0.3. In these or other embodiments, the material is characterized by a coefficient of friction, measured at 85-90% relative humidity and room temperature, less than 0.8, 0.7, 0.6, 0.5, 0.4, 0.3, or 0.2. The low-ice-adhesion material may be characterized by a coefficient of friction, measured at about 90% relative humidity, less than 0.5.

The coefficient of friction is relatively low due to the presence of a lubricating surface layer. By a "lubricating surface layer in the presence of humidity," it is meant a layer, multiple layers, a partial layer, or an amount of substance that lubricates the substrate such that it has a lower coefficient of friction compared to the substrate without the low-ice-adhesion material present, when in the presence of some amount of atmospheric humidity. Relative humidity is the ratio of the water vapor density (mass per unit volume) to the saturation water vapor density. Relative humidity is also approximately the ratio of the actual to the saturation vapor pressure.

The substance that lubricates the substrate is primarily water, but it should be noted that other components from the environment may be present in the lubricating surface layer, including oils, metals, dust, dissolved gases, dissolved aqueous components, suspended non-aqueous components, fragments of debris, fragments of polymers, and so on.

The low-ice-adhesion material may be characterized by a delay in the formation of ice on a surface of the material. For example, when a material surface is held at −10° C., the material provided by the invention may be characterized by an average delay in the formation of ice on the surface of at least about 5, 10, 15, 20, 25, 30 minutes, or more.

In various embodiments, the material is a coating and/or is present at a surface of an object or region. The material may be utilized in relatively small applications, such as lens coatings, or for large structures, such as aircraft wings. In principle, the material could be present within a bulk region of an object or part. In certain embodiments, the coating provided herein is disposed with a temporary, protective laminating film for storage or transport, which film is later removed.

The principles of the invention may be applied in a wide variety of coatings, materials, and structures. For example, this disclosure describes icephobic, urethane-based coatings that demonstrate low coefficients of friction and extended freezing delays and/or very low ice adhesion.

In this specification, "ice" should be broadly construed to refer to any possible solid phase of water, solid phase containing water, or multiphase mixtures containing solid water.

The coatings disclosed herein may be applied to aerospace-relevant surfaces. As intended herein, an "aerospace-relevant surface" is any surface, substrate, or region of material which may be exposed to ice or water that has the potential to freeze, and which is contained on or in an aerospace structure. Examples of aerospace-relevant surfaces include, but are not limited to, surfaces of airfoils, aircraft wings, rotor blades, propeller blades, engine-intake regions, nose cones, fan blades, windows, or antennas. Aerospace-relevant surfaces may be any portions of these surfaces, or surfaces which overlap, or contain other surfaces. In some embodiments, the aerospace-relevant surface is an airfoil surface, which is typically not a flat surface. In certain embodiments, the airfoil surface is a curved surface of a rotorcraft airfoil. In certain embodiments, the coatings may be applied onto aircraft exteriors, in order to passively suppress the growth of ice near strategic points on the vehicle (e.g., rotorblade edge, wing leading edge, or engine inlet).

The coatings disclosed herein may be applied to other structures including, but not limited to, wind turbine blades, automobiles, trucks, trains, ocean-going vessels, electrical power transmission lines, buildings, antennas, chemical plant infrastructure (e.g., distillation columns and heat exchangers), and so on. Other practical applications for the present invention include, but are not limited to, vehicle windows, filters, instruments, sensors, cameras, satellites, and weapon systems. For example, automotive applications can utilize these coatings to prevent the formation of ice on back-up sensors.

Other variations provide a method of forming a low-ice-adhesion composition, the method comprising:

(a) obtaining a hardenable precursor material for a low-ice-adhesion composition, the hardenable precursor material comprising a first component and a second component, wherein the first component may be a low-surface-energy polymer having a surface energy between about 5 mJ/m$^2$ to about 50 mJ/m$^2$, and the second component may be a hygroscopic material;

(b) applying the hardenable precursor material to a substrate surface; and (c) curing the hardenable precursor material to form a low-ice-adhesion composition comprising a hardened continuous matrix that is both nanophase-separated and microphase-separated, i.e. the hardened continuous matrix is a composite material containing at least a first-material phase and a second-material phase that is chemically distinct from the first-material phase, wherein the first-material phase and the second-material phase are nanophase-separated on an average nanophase-separation length scale from about 10 nanometers to less than 100 nanometers, wherein the first-material phase and the second-material phase further are microphase-separated on an average microphase-separation length scale that is from about 0.1 microns to about 100 microns and is hierarchically distinct from the nanophase-separation length scale, and wherein the composite material has a glass-transition temperature above −80° C.

Other variations provide a method of forming a low-ice-adhesion composition, the method comprising:

(a) obtaining a low-ice-adhesion material comprising:
a composite material containing at least a first-material phase and a second-material phase that is chemically distinct from the first-material phase, wherein the first-material phase and the second-material phase are nanophase-separated on an average nanophase-separation length scale from about 10 nanometers to less than 100 nanometers, wherein the first-material phase and the second-material phase further are microphase-separated on an average microphase-separation length scale that is from about 0.1 microns to about 100 microns and is hierarchically distinct from the nanophase-separation length scale, and wherein the composite material has a glass-transition temperature above −80° C.; and (b) applying the low-ice-adhesion material to a substrate surface, thereby forming a composition containing the low-ice-adhesion material.

Optionally, a solvent may be present with the low-ice-adhesion material that is applied to the substrate surface. The solvent may be removed during or after the process of applying the coating, such as by drying, vacuum, curing, and so on.

These methods are different than patterning phase inhomogeneity by creating an inhomogeneous microstructure with microscale lithography.

Any known methods to fabricate these low-ice-adhesion materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process.

The low-ice-adhesion material, in some embodiments, is formed from a precursor material (or combination of materials) that may be provided, obtained, or fabricated from starting components. The precursor material is capable of hardening or curing in some fashion, to form a substantially continuous matrix along with a plurality of inclusions, dispersed within the matrix. The precursor material may be a liquid; a multiphase liquid; a multiphase slurry, emulsion, or suspension; a gel; or a dissolved solid (in solvent), for example.

A low-surface-energy polymer and a hygroscopic material may be in the same phase or in different phases, within the precursor material. In some embodiments, a low-surface-energy polymer is in liquid or dissolved form while a hygroscopic material is in dissolved-solid or suspended solid form. In some embodiments, a low-surface-energy polymer is in dissolved-solid or suspended-solid form while a hygroscopic material is in liquid or dissolved form. In some embodiments, a low-surface-energy polymer and a hygroscopic material are both in liquid form. In some embodiments, a low-surface-energy polymer and a hygroscopic material are both in dissolved (solvent) form.

In preferred embodiments of the invention, an emulsion sets up in the reaction mixture based on incompatibility between the two blocks (e.g., PEG and PFPE). The emulsion provides microphase separation in the precursor material. The precursor material is then cured from casting or spraying. The microphase separation survives the curing process (even if the length scales change somewhat during curing), providing the benefits in the final materials as described herein. Without being limited by theory, the microphase separation in this invention is not associated with molecular length-scale separation (5-50 nm) that many classic block-copolymer systems exhibit. Rather, the larger length scales of microphase separation, e.g. 0.1-100 µm, arise from the emulsion that was set-up prior to curing.

Xu et al., "Structure and morphology of segmented polyurethanes: 1. Influence of incompatibility on hard-segment sequence length" POLYMER, Vol. 24, pages 1327-1332, 1983, and Chen et al., Structure and morphology of segmented polyurethanes: 2. Influence of reactant incompatibility" POLYMER, Vol. 24, pages 1333-1340, 1983, are each hereby incorporated by reference herein for their teachings about emulsion set-up in polyurethane systems prior to curing. Chen and Xu describe the phenomenon in urethane synthesis occurring when components are strongly immiscible, creating a phase-separated microstructure on the micron length scale driven by an oil-in-water style phase separation of fluid precursor materials. Petrovic et al., "Polyurethane Elastomers" *Prog Polym Sci*, Vol. 16, 695-836, 1991, is hereby incorporated by reference herein for its review of segmented polyurethane elastomers including synthesis, morphology (at the molecular level), and mechanical properties.

In some variations of the invention, a material or coating precursor is applied to a substrate (such as a surface of an automobile or aircraft) and allowed to react, cure, or harden to form a final low-ice-adhesion coating, wherein the material, coating precursor, or final coating contains a segmented copolymer composition.

In some embodiments, the hygroscopic material is also hardenable, either alone or in combination with the low-surface-energy polymer. For instance, a low-surface-energy polymer and a hygroscopic polymer may form a high-molecular-weight block copolymer and thus harden. In certain embodiments, the hygroscopic material assists in the curability (hardenability) of the low-surface-energy polymer.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. The fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), ethers (such as tetrahydrofuran, dioxane, or diethyl ether), hydrocarbons (e.g., toluene), acetates (such as tert-butyl acetate or n-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final low-ice-adhesion material or coating may be from about 1 µm to about 1 cm or more, such as about 5 µm, 10 µm, 20 µm, 25 µm, 30 µm, 40 µm, 50 µm, 75 µm, 100 µm, 200 µm, 300 µm, 400 µm, 500 µm, 750 µm, 1 mm, 2 mm, 3 mm, 4 mm, 5 mm, 6 mm, 7 mm, 8 mm, 9 mm, 10 mm, or more.

Relatively thick coatings offer good durability and mechanical properties, such as impact resistance, while being relatively lightweight. In certain embodiments, a low-ice-adhesion film has a thickness from about 10 microns to about 10 millimeters. If desired, a coating may have a varying thickness, such as greater thickness at high surface curvature, for example.

EXAMPLES

Materials.

Poly(ethylene glycol) (PEG) with $M_n$=3400 g/mol (unless otherwise noted), 4,4'-methylenebis(cyclohexyl isocyanate) (HMDI), 1,4-butanediol (BD), dibutyltin dilaurate (DBTDL), tetrahydrofuran, and methyl isobutyl ketone are purchased from Sigma-Aldrich. Fluorolink E10-H, Fluorolink D4000, and 5147X PFPE-ethoxylated diol are purchased from Solvay Specialty Polymers. All chemicals are used as received without further purification. Note that solvents may be processed through activated sieves to remove trace amounts of water, since water may cause the formation of side products during polyurethane synthesis.

Example 1: Low-Ice-Adhesion Material

PEG (1.5 mmoles, 5.1 g) and HMDI (15 mmoles, 3.94 g) are added into a 3-neck flask equipped with a mechanical stirrer. The reaction flask is placed in a 100° C. oil bath. Once PEG is melted and dissolved in the HMDI, 10 µL, of DBTDL is added to the mix. The reaction mixture is stirred at 100° C. for 1 hour. Fluorolink D4000 (1.5 mmoles, 6 g) is added and stirring is continued for another 1 hour. The reaction flask is removed from the 100° C. oil bath and allowed to cool down before adding THF (10 mL) and BD (12 mmoles, 1.08 g) dissolved in THF (2 mL). The THF and BD are added to the viscous resin and vortexed to disperse and thin the overall mixture. The sample is sprayed with an HVLP gun using a 1.7 mm nozzle aperture to a thickness of 8.5 mils (216 µm). The spray coating is allowed to cure under ambient conditions for 16 hours. This Example 1 material contains equimolar quantities of PFPE and poly (ethylene glycol).

The kinetic delay of freezing is measured by placing 50 µL drops of deionized water on a surface held at −10° C. with a thermoelectric cooler. The time for ice to initially form in the droplets is measured (5 droplets are measured). The kinetic delay of freezing is found to be 8.0±1.5 minutes. A bare aluminum (Al) surface has an ice formation delay of 0.2±0.1 minutes. The surprisingly long ice formation delay may be due to the material trapping water at the surface. Without being limited by theory, it is believed that this trapped layer of water cannot freeze because the hygroscopic domains inhibit the crystallization reaction mechanisms in the surface water. Any droplet of water on the surface sees liquid water instead of a coating on the surface; ice nucleation is confined to the homogeneous nucleation regime that is kinetically much slower than heterogeneous nucleation.

The change in friction in response to humidity is tested by equilibrating the sample at ambient (40-55%) relative humidity or 85-90% relative humidity in a humidity-controlled chamber. Then the sample is placed on a variable-angle stage and the angle is increased until a 5-gram cylindrical mass slides along the sample surface. The sliding angle is used to determine the friction constant (coefficient of friction). The coefficient of friction at 40-55% relative humidity is measured to be 0.45, and the coefficient of friction at 85-90% relative humidity is measured to be 0.38.

Atomic force microscopy (AFM) is carried out using a Dimension 3100 AFM instrument combined with an optical microscope. Samples of the Example 1 material are sprayed onto small steel discs compatible with the Dimension 3100 AFM scan head. Next the steel discs are placed in the Dimension 3100 AFM instrument, and images are captured in both height and phase. Height (left) and phase (right) images of the Example 1 material are shown in each of FIGS. 6A, 6B, and 6C. The fields of view are 10 µm×10 µm for FIG. 6A, 3 µm×3 µm for FIG. 6B, and 1 µm×1 µm for FIG. 6C. The height images indicate the material topography within the selected field of view. Note that phase here refers to the time lag in the response of the force-sensing tip in the atomic force microscope. The phase images show changes in material surface stiffness/softness, which allows imaging of material phases—a distinct fluoropolymer phase and a distinct PEG phase.

Figure 6A:
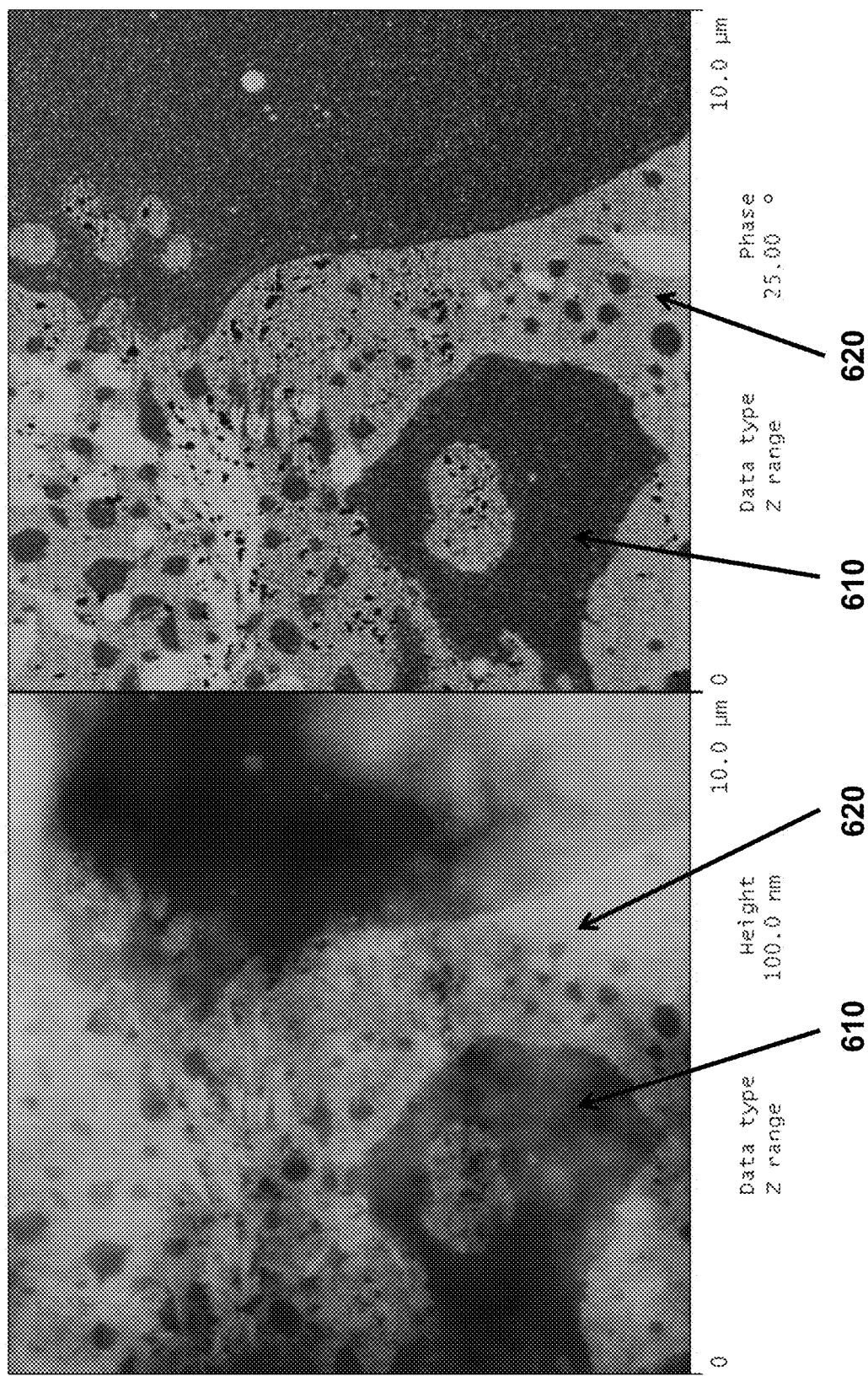
FIG. 6A shows AFM height (left) and phase (right) images for the Example 1 material, with a field of view of 10 μm×10 μm.
Figure 6B:
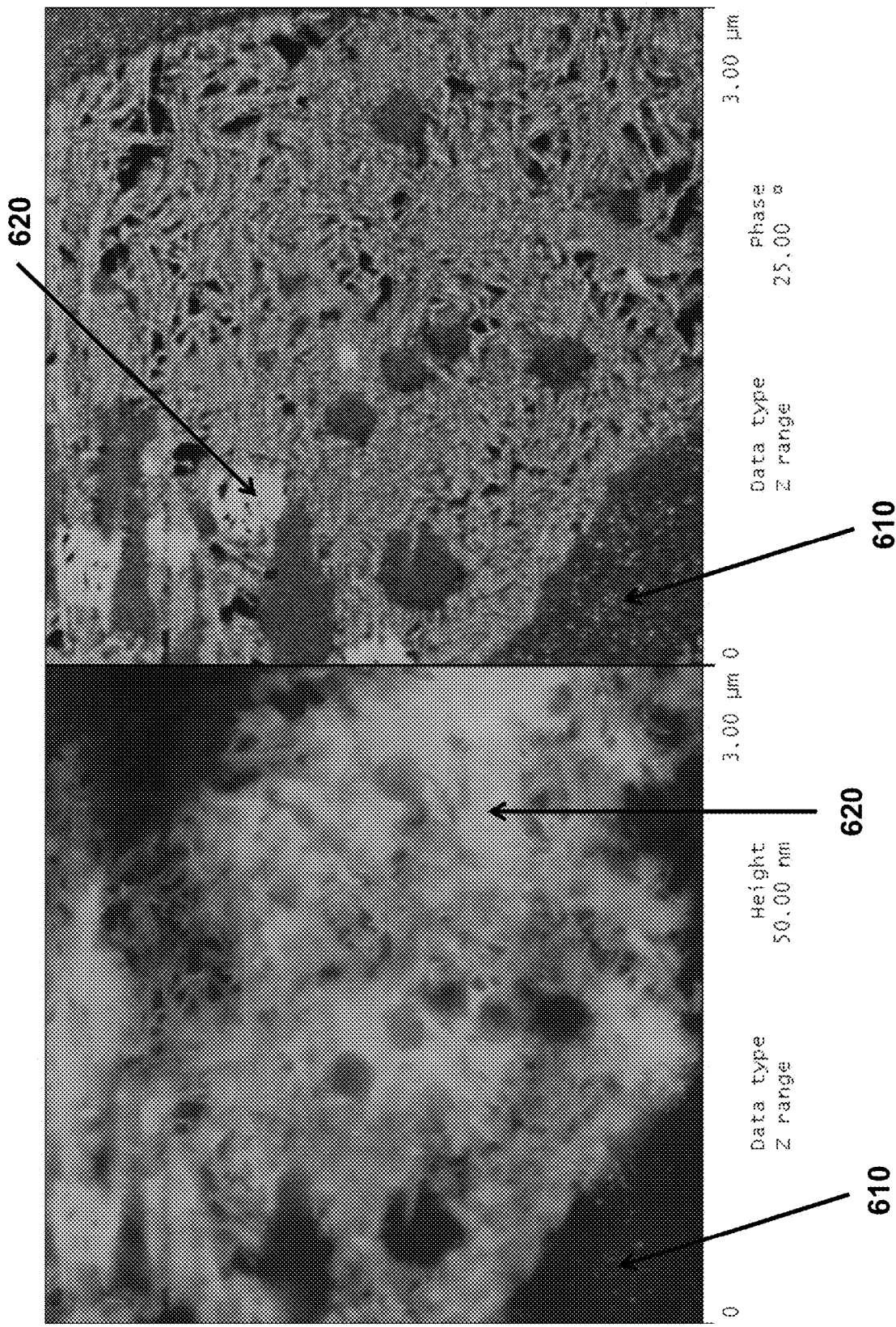
FIG. 6B shows AFM height (left) and phase (right) images for the Example 1 material, with a field of view of 3 μm×3 μm.
Figure 6C:
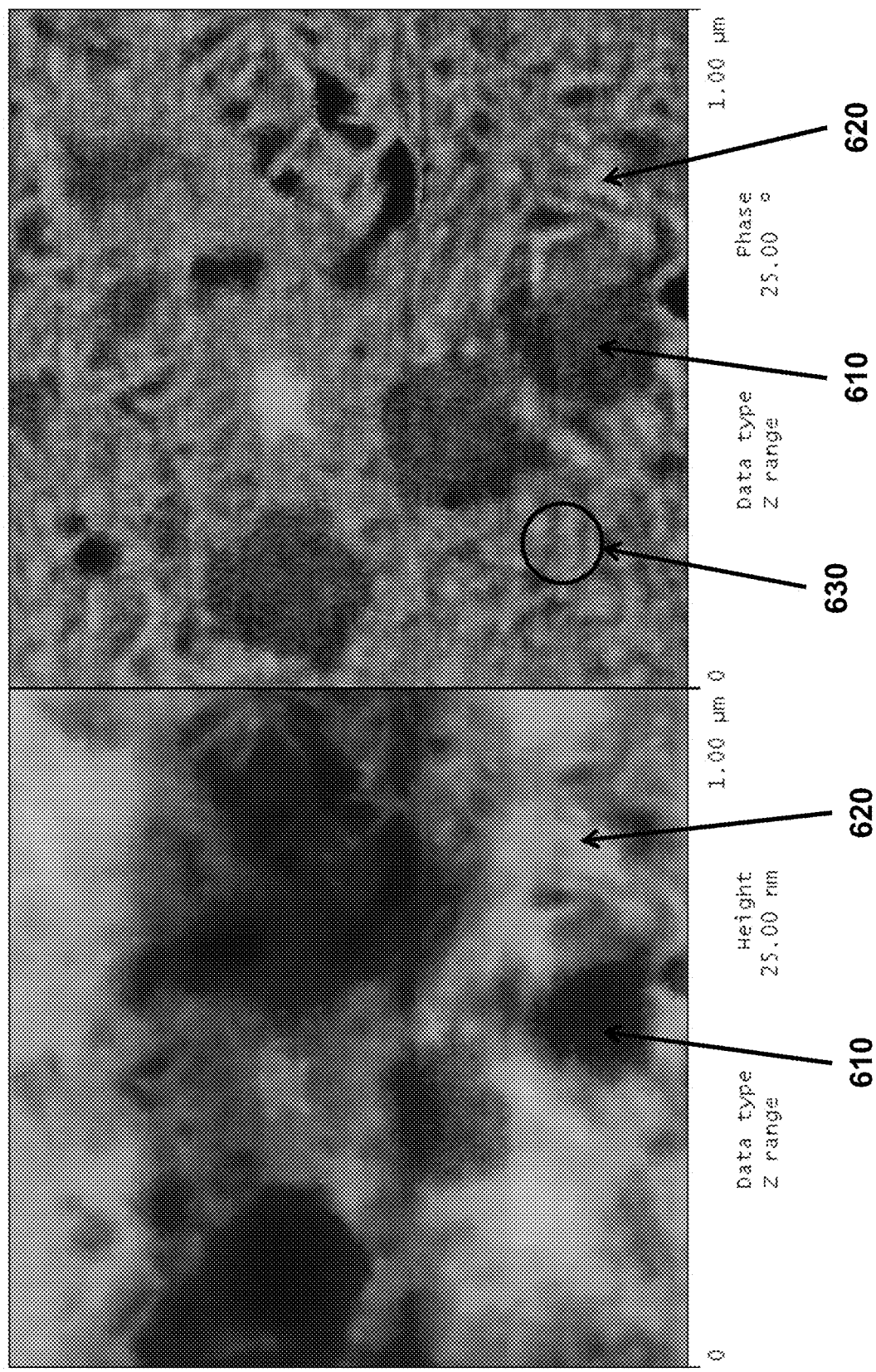
FIG. 6C shows AFM height (left) and phase (right) images for the Example 1 material, with a field of view of 1 μm×1 μm.

Based on output parameters, it is determined that the fluoropolymer phase corresponds to the discrete yellow areas 620 on the images of FIGS. 6A, 6B, and 6C (the yellow areas in the color drawings display as lighter regions when reproduced in grayscale), and the continuous PEG phase corresponds to the dark orange areas 610 on the images of FIGS. 6A, 6B, and 6C (the dark orange areas in the color drawings display as darker regions when reproduced in grayscale). The microphase-separation length scales in these images are in the range of approximately 0.1 micron to 10 microns.

AFM is also able to resolve molecular features on nano-phase-separation length scales from about 10 nanometers to about 50 nanometers. In particular, in FIG. 6C, a selected area 630 reveals phase separation on length scales from about 0.015 microns to about 0.03 microns, which is 15 nanometers to 30 nanometers.

The Example 1 material is also tested for glass-transition temperature $T_g$. The material is subjected to a Dynamic Mechanical Analyzer (DMA) temperature sweep using a temperature ramp of 3° C./min. FIG. 7 shows storage modulus (MPa) versus temperature (degrees Celsius). Cooling of the material shows a stiffening storage modulus that increases by nearly two orders of magnitude (about 10 MPa to about 1000 MPa) in a sigmoidal curve. The midpoint of this sigmoidal curve is taken as the glass-transition temperature, which indicates a $T_g$ of about −25° C.

Note that PFPE precursors typically have $T_g$ values between −100° C. and −90° C. Poly(ethylene glycol) has a $T_g$ of −66° C. The $T_g$ of the copolymer produced (Example 1 material) is significantly higher than the $T_g$ of either of the individual components. This is believed to be due to the modifying effect of the urethane/urea bonds (hard segments) between soft segments that produce a stiffening effect.

Example 2: Low-Ice-Adhesion Material with High-Molecular-Weight PFPE and Low-Molecular-Weight PEG Hydroxy-terminated poly(ethylene glycol) ($M_n$=1000 g/mol, 6.5 g, 6.5 mmol) is placed in a 3-neck roundbottom flask that contains an inlet for argon and is equipped with an overhead stirrer (Teflon shaft and blade). While stirring, 4,4'-methylenebis(cyclohexyl isocyanate) (6.4 g, 24.6 mmol) is added to the solution and the flask is placed in an oil bath at 100° C. Dibutyltin dilaurate (0.02 wt %) is then added to the solution using a micropipette and the reaction is allowed to proceed.

After 1 hour, Fluorolink D4000 ($M_n$=4000 g/mol, 6.5 g, 1.6 mmol) is added to the stirring solution and allowed to react for 1 hour at 100° C. The prepolymer is allowed to cool slightly before addition of n-butyl acetate (3.7 g). After the addition of n-butyl acetate, the prepolymer is mixed at 300 rpm. The chain extender 1,4-butanediol (1.5 g, 16.4 mmol) is then added to the prepolymer. After the curative and prepolymer solution are combined in a plastic mixing container (FlackTek-speedmixer compatible), the mixture is placed in the FlackTek at 2300 rpm for 15 seconds to 1 minute. The polymer may be drop-casted to form a film or diluted further to spray using an air gun to create a polyurethane film/coating.

This Example 2 material contains equimolar quantities of PFPE and poly(ethylene glycol) with molecular weight $M_n$=1,000 g/mol. A DMA (Dynamic Mechanical Analyzer) temperature sweep of storage modulus gives an estimated $T_g$ in the range of about −20° C. to −30° C. (midpoint of the modulus-temperature curve on cooling). This measured $T_g$ is similar to the $T_g$ found with PEG at $M_n$=3,400 g/mol (Example 1).

Example 3: Low-Ice-Adhesion Material

PEG (1.0 mmoles, 3.4 g) and HMDI (19.3 mmoles, 5.06 g) are added into a 3-neck flask equipped with a mechanical stirrer. The reaction flask is placed in a 100° C. oil bath. Once PEG is melted and dissolved in the HMDI, 10 μL of DBTDL is added to the mix. The reaction mixture is stirred at 100° C. for 1 hour. Fluorolink E10H (2.7 mmoles, 5.27 g) is added and stirring is continued for another 1 hour. The reaction flask is removed from the 100° C. oil bath and allowed to cool down before adding THF (10 mL) and BD (15.4 mmoles, 1.39 g) dissolved in THF (2 mL). The THF and BD are added to the viscous resin and vortexed to disperse and thin the overall mixture. The sample is sprayed with an HVLP gun using a 1.7 mm nozzle aperture to a thickness of 4 mils. The spray coating is allowed to cure under ambient conditions for 16 hours.

The kinetic delay of freezing is measured by placing 50 μL drops of deionized water on a surface held at −10° C. with a thermoelectric cooler. The time for ice to initially form in the droplets is measured (5 droplets are measured). The kinetic delay of freezing is found to be 5.1±0.2 minutes. A bare aluminum (Al) surface has an ice formation delay of 0.2±0.1 minutes. The surprisingly long ice formation delay may be due to the material trapping water at the surface. Without being limited by theory, it is believed that this trapped layer of water cannot freeze because the hygroscopic domains inhibit the crystallization reaction mechanisms in the surface water. Any droplet of water on the surface sees liquid water instead of a coating on the surface; ice nucleation is confined to the homogeneous nucleation regime that is kinetically much slower than heterogeneous nucleation.

The change in friction in response to humidity is tested by equilibrating the sample at ambient (40-55%) relative humidity or 85-90% relative humidity in a humidity-controlled chamber. Then the sample is placed on a variable-angle stage and the angle is increased until a 5-gram cylindrical mass slides along the sample surface. The sliding angle is used to determine the friction constant (coefficient of friction). The coefficient of friction at 40-55% relative humidity is measured to be 0.32, and the coefficient of friction at 85-90% relative humidity is measured to be 0.35. While the friction coefficient increases slightly with increased humidity, the result is still a smooth, low-friction coating.

Example 4: Low-Ice-Adhesion Material

PEG (1.5 mmoles, 5.1 g) and HMDI (15 mmoles, 3.94 g) are added into a 3-neck flask equipped with a mechanical stirrer. The reaction flask is placed in a 100° C. oil bath. Once PEG is melted and dissolved in the HMDI, 3 μL of DBTDL is added to the mix. The reaction mixture is stirred at 100° C. for 1 hour. Fluorolink D4000 (1.5 mmoles, 6 g) is added and stirring is continued for another 1 hour. The reaction flask is removed from the 100° C. oil bath and allowed to cool down before adding THF (10 mL) and BD (12 mmoles, 1.08 g) dissolved in THF (2 mL). The THF and BD are added to the viscous resin and vortexed to disperse and thin the overall mixture. The sample is sprayed with an HVLP gun using a 1.7 mm nozzle aperture to a thickness of 4 mils. The spray coating is allowed to cure under ambient conditions for 16 hours.

Example 5: Low-Ice-Adhesion Material

PEG (1.5 mmoles, 5.1 g) and HMDI (15 mmoles, 3.94 g) are added into a 3-neck flask equipped with a mechanical stirrer. The headspace of the reaction is continually purged with $N_2$ over the course of the reaction. The reaction flask is placed in a 100° C. oil bath. Once PEG is melted and dissolved in the HMDI, 3 μL of DBTDL is added to the mix. The reaction mixture is stirred at 100° C. for 1 hour. Fluorolink D4000 (1.5 mmoles, 6 g) is added and stirring is continued for another 1 hour. The reaction flask is removed from the 100° C. oil bath and allowed to cool down before adding THF (10 mL) and BD (12 mmoles, 1.08 g) dissolved in THF (2 mL). The sample is sprayed with an HVLP gun using a 1.7 mm nozzle aperture to a thickness of 4 mils. The spray coating is allowed to cure under ambient conditions for 16 hours.

Example 6: Low-Ice-Adhesion Material

PEG (1.5 mmoles, 5.1 g) and HMDI (15 mmoles, 3.94 g) are added into a 3-neck flask equipped with a mechanical stirrer. The headspace of the reaction is continually purged with $N_2$ over the course of the reaction. The reaction flask is placed in a 100° C. oil bath. Once PEG is melted and dissolved in the HMDI, 3 µL of DBTDL is added to the mix. The reaction mixture is stirred at 100° C. for 1 hour. Fluorolink D4000 (1.5 mmoles, 6 g) is added and stirring is continued for another 1 hour. The reaction flask is removed from the 100° C. oil bath and allowed to cool down before adding THF (10 mL) and BD (12 mmoles, 1.08 g) dissolved in THF (2 mL). The THF and BD are added to the viscous resin and vortexed to disperse and thin the overall mixture. The sample is sprayed with an HVLP gun using a 1.7 mm nozzle aperture to a thickness of 4.5 mils. The spray coating is then cured in an oven at a temperature of 60-80° C. for about 4 hours, resulting in an especially tough coating material.

The polymer network is composed of both a water-absorbing (hydrophilic) and a water-repelling (hydrophobic) material. To investigate the film's network and microphase separation of the opposing materials, confocal microscopy is employed. Confocal microscopy is an optical imaging technique that detects fluorescence by exposing the specimen to light of a certain wavelength to excite fluorescent dyes. Samples are prepared by soaking a thin slice of film in an aqueous solution containing fluorescein (10 to 100 µM), a water-soluble dye, for 24 hours. The thinner the film, the better for allowing light to go through the sample. Confocal microscopy allows imaging of xy-plane with thin optical z-slice to prevent background fluorescence. Water absorbed by the film contains fluorescein, allowing contrast between the hydrophilic and hydrophobic domains. Once removed from the solution, the film is rinsed with DI water to remove excess fluorescein from the surface. The film is quickly pat dried to remove water droplets and placed on a glass slide (75×25 mm). A glass coverslip (0.17 mm thick) is placed firmly on the film and the edges are sealed with a quick cure 5-minute epoxy. The edges are sealed to prevent evaporation of water to allow optimal imaging of the specimen by better matching the refractive index of the glass. The fluorescent imaging is obtained using a Leica SP 5 confocal microscope with an argon laser for an excitation wavelength of 496 nm for fluorescein, giving an emission at 512 nm in water.

Figure 2B:
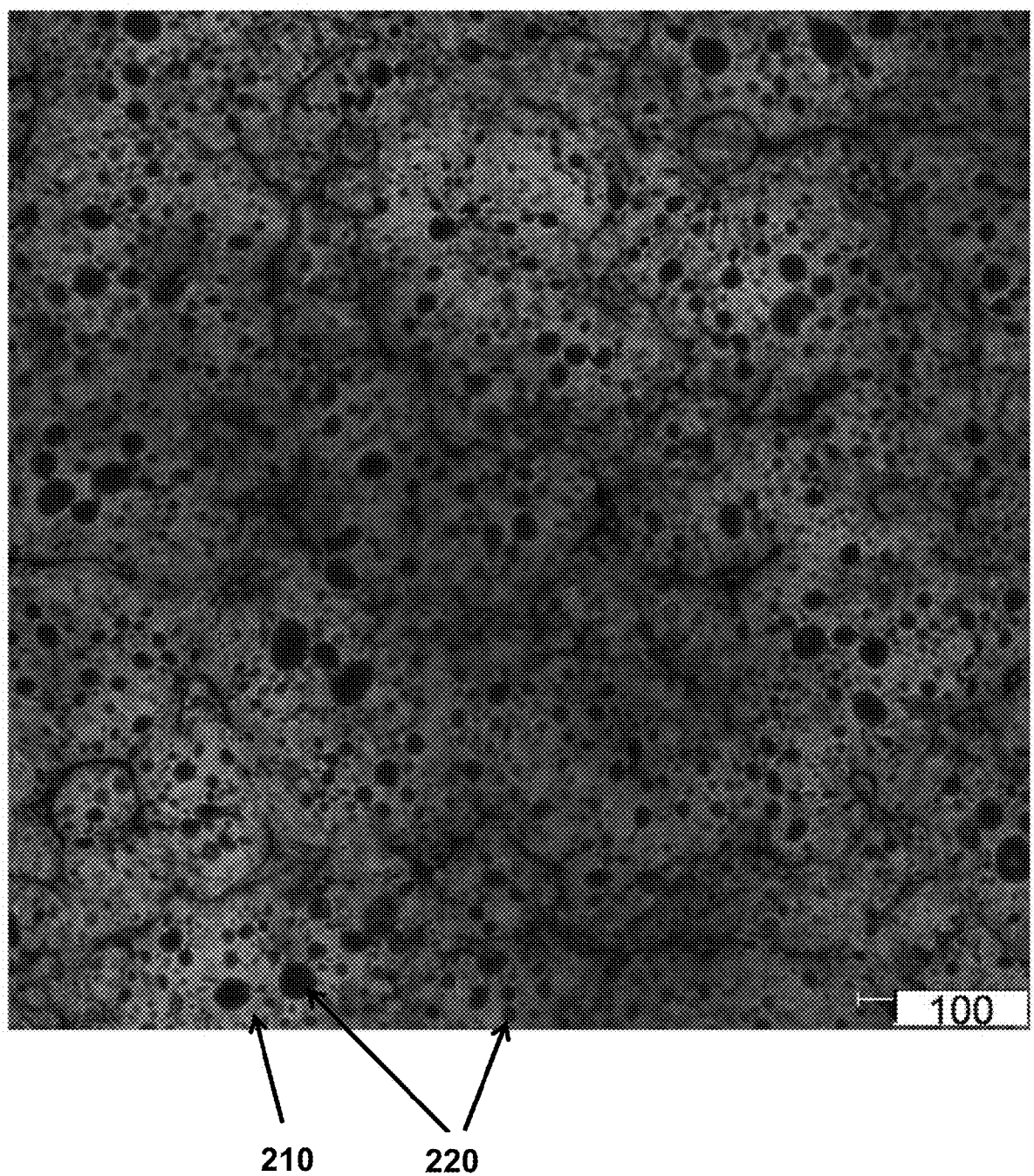
FIG. 2B shows a CLSM image for the coating of Example 5 (scale bar=100 μm).
Figure 2C:
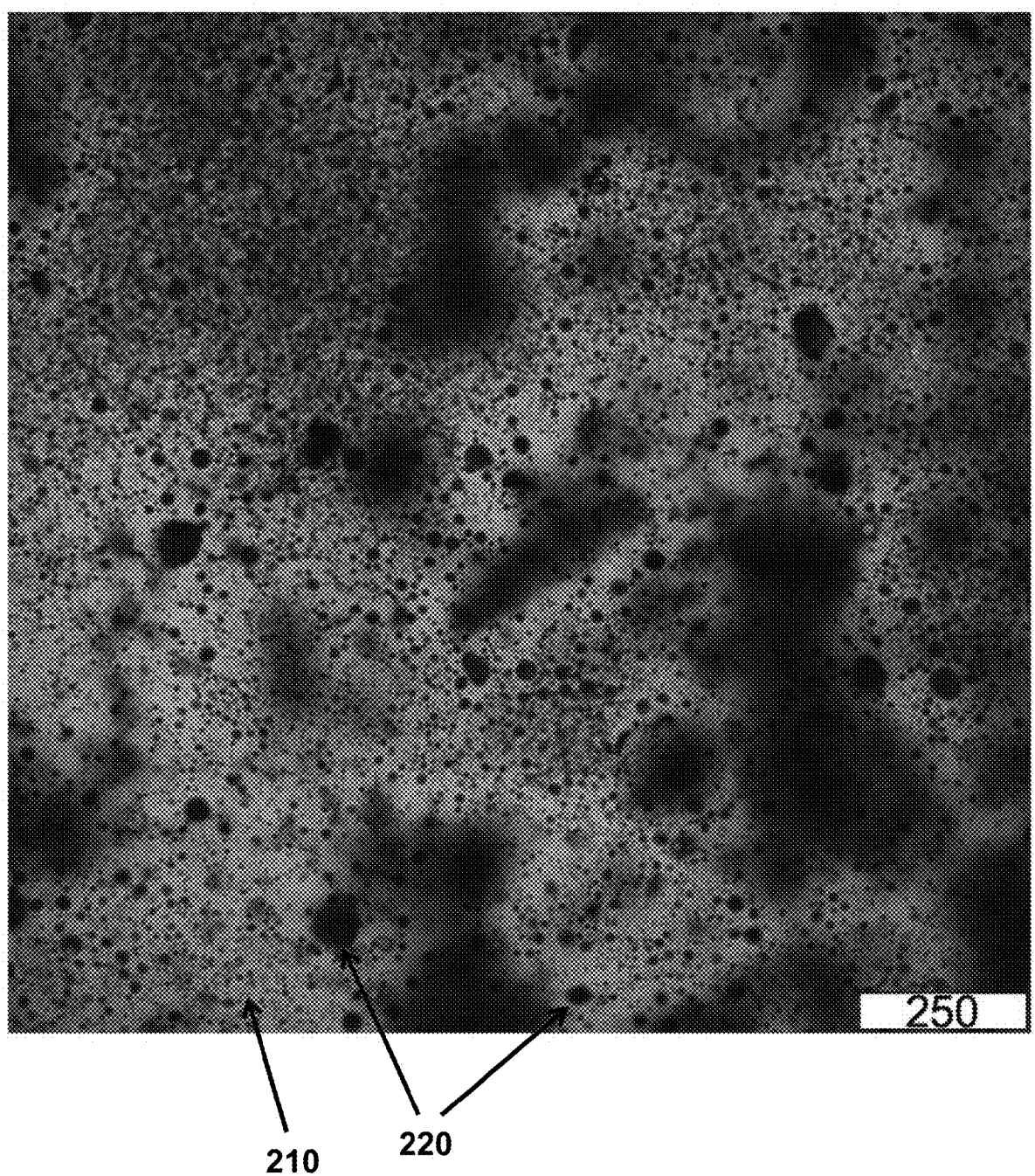
FIG. 2C shows a CLSM image for the coating of Example 5 (scale bar=250 μm).

FIGS. 2A, 2B, and 2C show confocal laser scanning microscopy (CLSM) images for the coating of Example 6. CLSM images are shown at different magnifications of the Example 6 films soaked with water-soluble fluorescent dye. The fluorescent regions 210 (which display as green regions in the color drawings and lighter regions when reproduced in grayscale) are representative of hydrophilic PEG regions containing a water-soluble fluorescent dye. The inclusions 220 (which display as darker regions) are representative of hydrophobic fluoropolymer regions. The scale bars are 25 µm, 100 µm, and 250 µm in FIGS. 2A, 2B, and 2C, respectively.

The selected (for illustration) inclusions 220 labeled in FIG. 2A have an effective diameter of about 15-30 microns; generally the inclusions have an effective diameter of about 1 to 50 microns in this image. The length scale of phase inhomogeneity may refer to the average center-to-center distance 225 between nearest-neighbor inclusions of the same phase 220. In FIG. 2A, the selected center-to-center distance 225 is about 25 microns. The length scale of phase inhomogeneity may alternatively refer to the average separation distance 215 between nearest-neighbor regions of the discrete (e.g., droplets) phase 220, i.e. the size of the continuous phase 210 regions. In FIG. 2A, the selected separation distance 215 is about 20 microns. A range of particle sizes and separations is clearly present in this structure; the specific instances of features 210, 215, 220, and 225 were arbitrarily selected. The average length scale of phase inhomogeneity is in the range of 1 micron to 50 microns in FIG. 2A.

FIGS. 2B and 2C also depict selected continuous phase regions 210 and discrete inclusions 220, noting that these are not necessarily the same regions of material as shown in FIG. 2A. Microphase separation is shown in these images.

FIGS. 2A, 2B, and 2C suggest an average length scale of phase inhomogeneity in the range of 1 micron to 50 microns. The discrete phase (darker regions 220) contains sizes of about 1-50 µm with center-to-center distances 225 of about 5-50 µm. The continuous phase (lighter regions 210) contains sizes 215 of about 1-100 µm. Therefore the length scale of phase inhomogeneity for the structure in FIGS. 2A, 2B, and 2C is in the range of 1 to 100 microns.

Example 7: Low-Ice-Adhesion Material Phase Inhomogeneity in the Depth Dimension

Figure 3A:
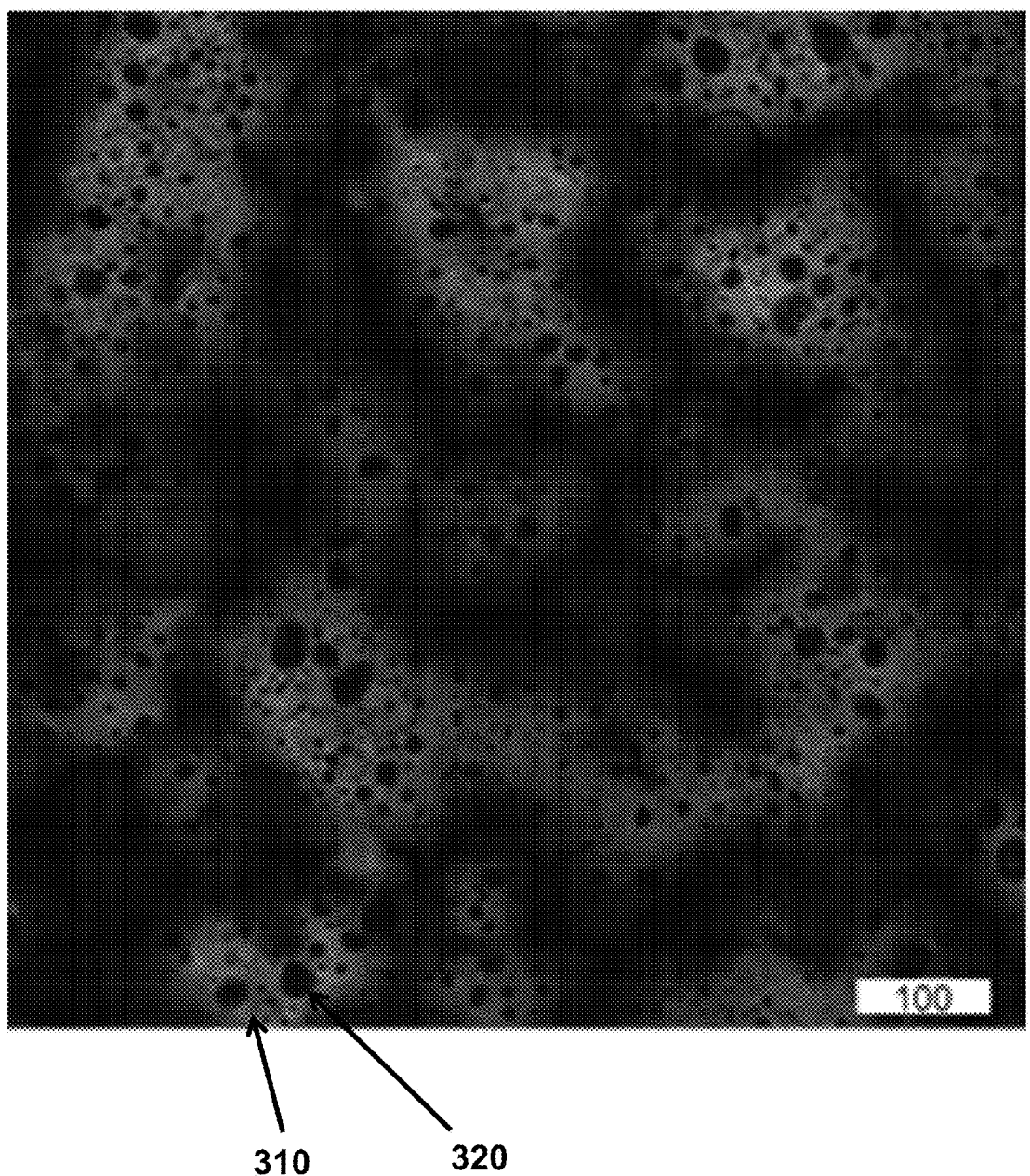
FIG. 3A shows a CLSM image for the coating of Example 6, at the surface of the film (scale bar=100 μm).
Figure 3B:
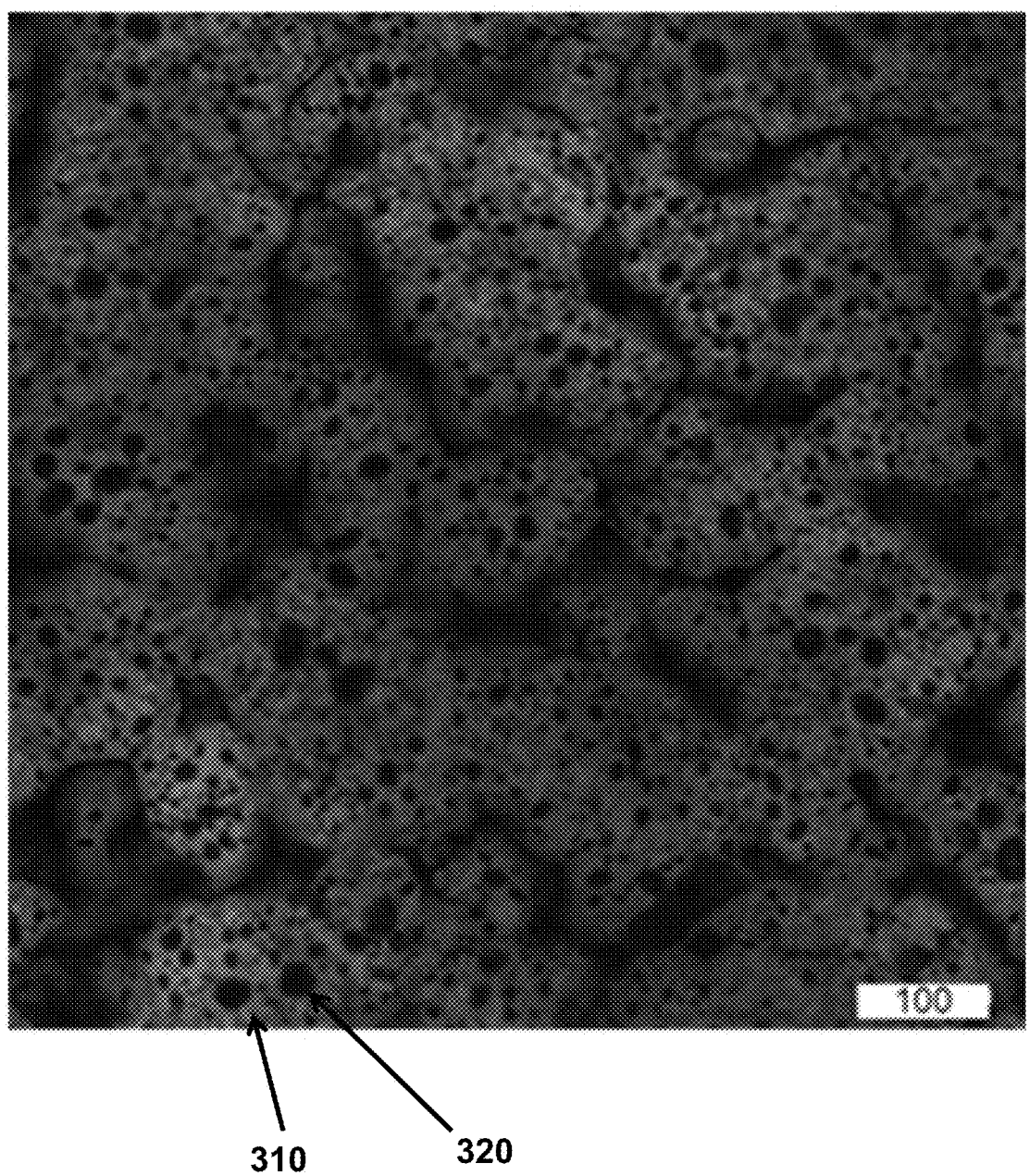
FIG. 3B shows a CLSM image for the coating of Example 6, at a depth of 12 μm (scale bar=100 μm).
Figure 3C:
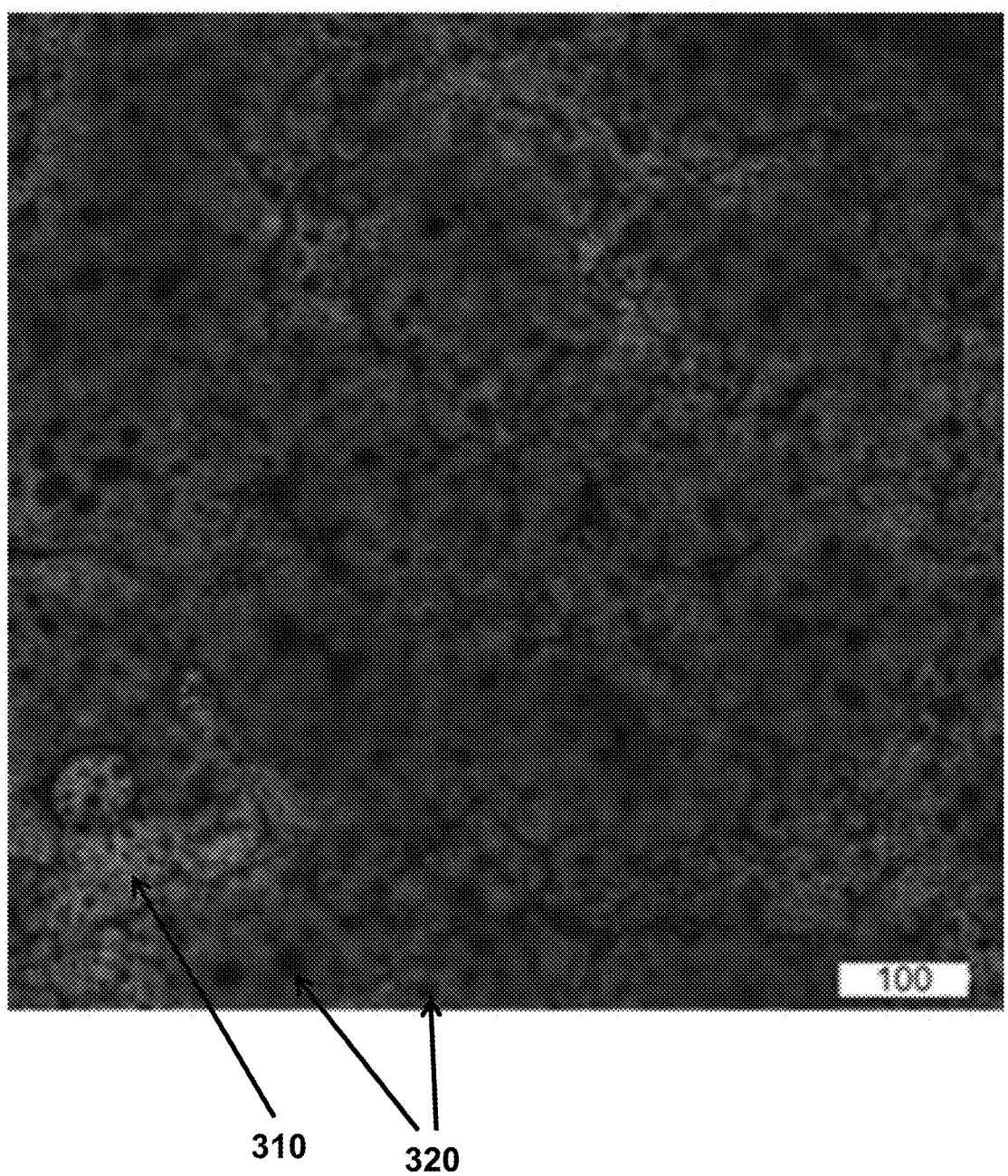
FIG. 3C shows a CLSM image for the coating of Example 6, at a depth of 26 μm (scale bar=100 μm).
Figure 3D:
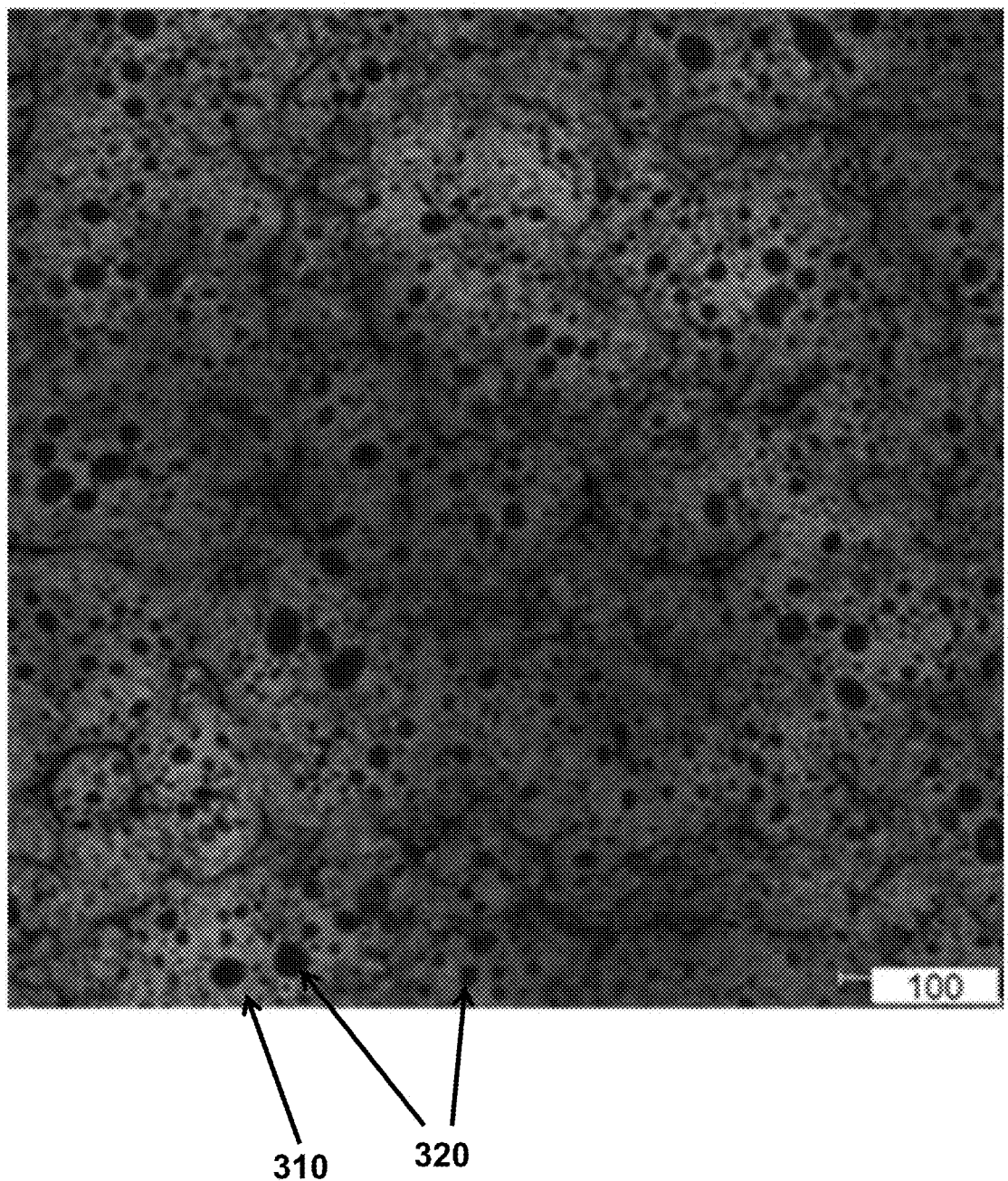
FIG. 3D shows the stacking of z-slices to reconstruct a sharper 2D image that displays inhomogeneity (microphase separation), in Example 6.

To create 3D CLSM images of the specimen (microstructure throughout the film), a z-stack is acquired. A z-stack takes a series of CLSM images keeping the xy-plane constant while moving through the film in the z-direction in thin sections. Depending on the film thickness, z-stacks may be acquired by taking images through 20 to 30 µm of the film in about 2 µm slices, for example FIGS. 3A to 3D show CLSM images for the depth of the coating of Example 3. Images are of the xy-plane at different depths in the z-direction. The scale bar in each of FIGS. 3A to 3D is 100 µm. FIG. 3A shows an image at the surface of the film, FIG. 3B shows an image at a depth of 12 µm, and FIG. 3C shows an image at a depth of 26 µm. The fluorescent regions (which display as green regions in the color drawings and lighter regions when reproduced in grayscale) are representative of PEG regions 310 containing a water-soluble fluorescent dye. The darker regions are representative of hydrophobic regions 320 that are microphase-separated from PEG regions 310. Micron-scale inhomogeneity is seen through the thickness of the film. FIG. 3D shows the stacking of all the z-slices to reconstruct a sharper 2D image that displays inhomogeneity (microphase separation). In particular, FIG. 3D shows that the size range of each of the separated phases 310 and 320 is approximately 1 to 50 microns, with most phase regions 310 and 320 being in the range of about 5 to 25 microns.

This example demonstrates that the micron-scale inhomogeneity propagates through the entire thickness of the coating. In other words, the microstructure is not just a surface effect and will be present even if the coatings are eroded over time.

Example 8: Clear Thermoplastic Material

Hydroxy-terminated poly(perfluoroether) (9.00 g, 3.73 mmol, Fluorolink 5147x) is placed in a 3-neck roundbottom flask that contains an inlet for argon and is equipped with an overhead stirrer (Teflon shaft and blade). While stirring, 4,4'-methylenebis(cyclohexyl isocyanate) (4.89 g, 18.66 mmol) is added to the solution and the flask is placed in an oil bath at 100° C. Dibutyltin dilaurate (0.02 wt %) is then added to the solution using a micropipette, and the reaction is allowed to proceed.

After 1 hr, the prepolymer is then allowed to cool down to room temperature. The prepolymer is diluted with tetrahydrofuran (15 mL) and placed in a plastic mixing container (FlackTek-speedmixer compatible). In a separate vial, 1,4-butanediol (1.35 g, 14.98 mmol) is weighed and diluted with tetrahydrofuran (0.5 mL). The two solutions are combined in the mixing container and placed in the FlackTek at 2300 rpm for 15 seconds. The sample is sprayed with an HVLP gun using a 1.7 mm nozzle aperture to a thickness of 4 mils. The spray coating is allowed to cure under ambient conditions for 16 hours.

Figure 4A:
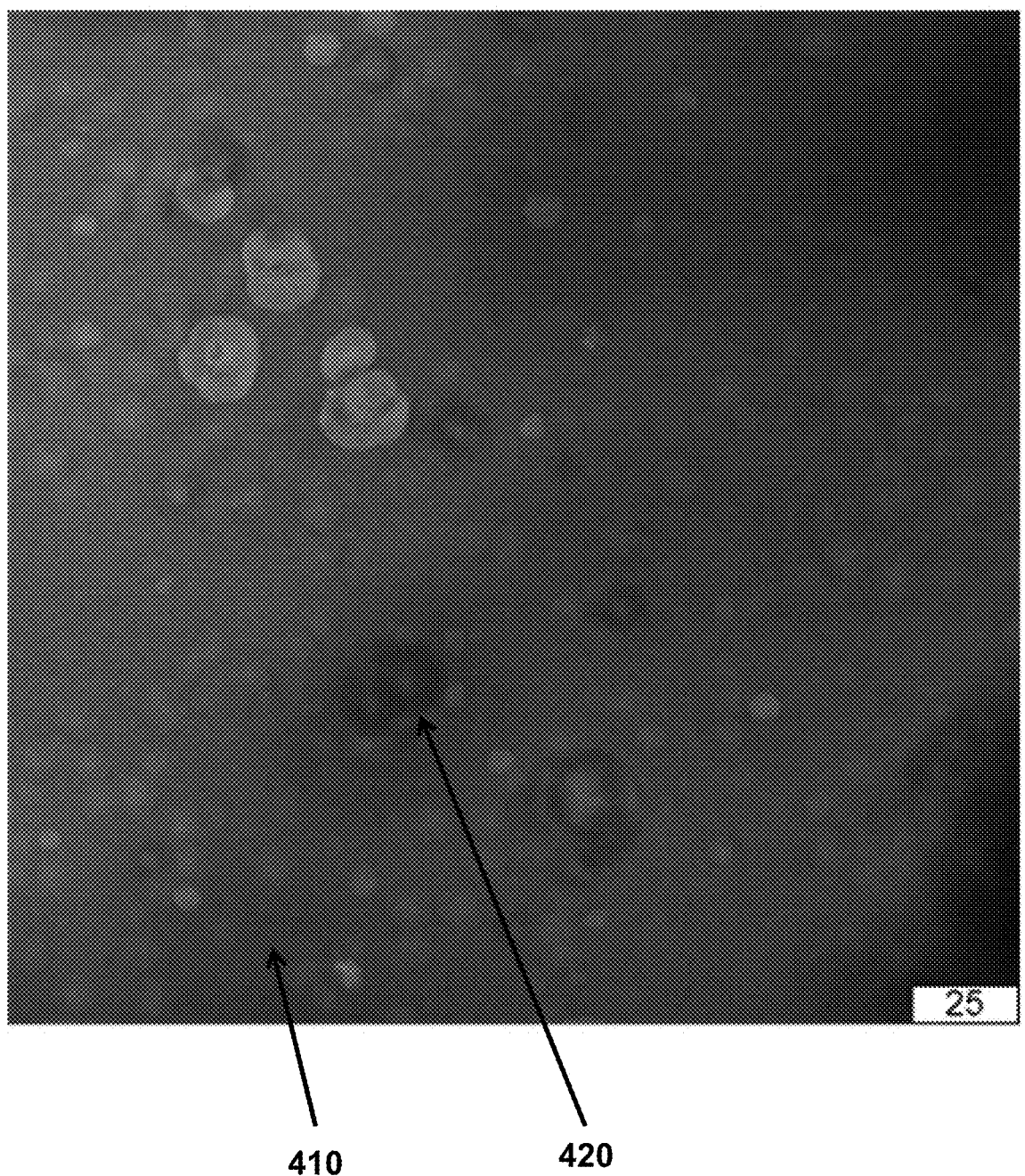
FIG. 4A shows a CLSM image for the coating of Example 7 (scale bar=25 μm).
Figure 4B:
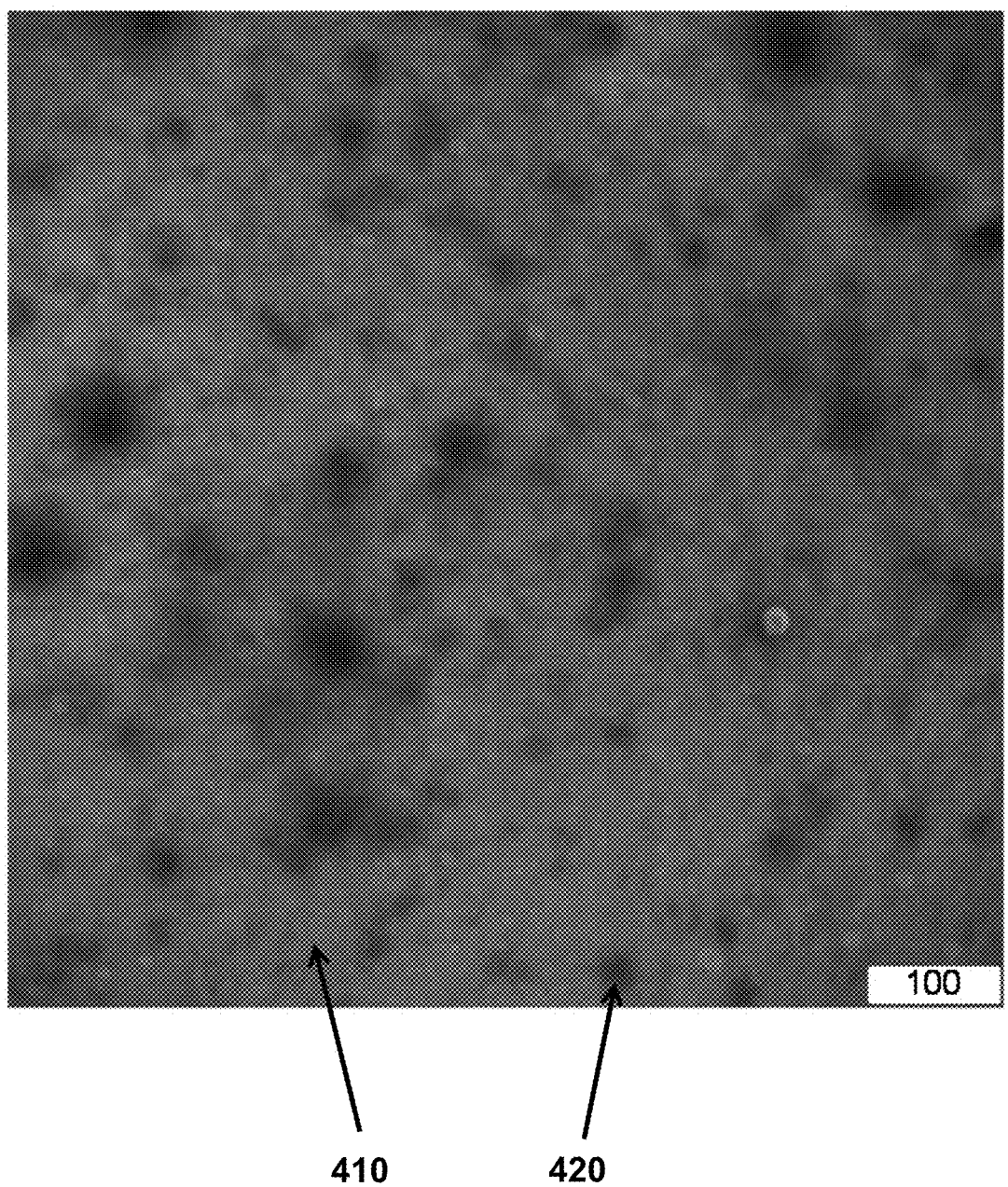
FIG. 4B shows a CLSM image for the coating of Example 7 (scale bar=100 μm).

The result is a clear, crosslinked fluoropolymer-based film. FIGS. 4A and 4B show CLSM images for this material. The scale bar for FIG. 4A is 25 µm, and the scale bar for FIG. 4B is 100 µm. The fluorescent regions (which display as green regions in the color drawings and lighter regions when reproduced in grayscale) are representative of regions 410 containing a water-soluble fluorescent dye. The darker regions are representative of hydrophobic regions 420. There is not much phase inhomogeneity on an average length scale of 0.1-500 microns, and thus relatively poor anti-ice performance. This example can therefore be considered a comparative example.

The freezing delay associated with this material (Example 7) is measured as 1.2±1.2 min, based on the same test protocol as Examples 1 and 2. The coefficient of sliding friction is measured at 0.14 at 55% relative humidity and 0.23 at 90% relative humidity, also based on the same test protocol as Examples 1 and 3.

Example 9: Clear Thermoset Material

Hydroxy-terminated poly(perfluoropolyether) (3.73 mmoles, 9.00 g, Fluorolink 5147x) is placed in a 3-neck roundbottom flask that contains an inlet for argon and is equipped with an overhead stirrer (Teflon shaft and blade). While stirring, 4,4'-methylenebis(cyclohexyl isocyanate) (18.66 mmoles, 4.89 g) is added to the solution and the flask is placed in an oil bath at 100° C. Dibutyltin dilaurate (0.02 wt %) is then added to the solution using a micropipette, and the reaction is allowed to proceed.

After 1 hr, the prepolymer is then allowed to cool down to room temperature. The prepolymer is diluted with 2-butanone (15 mL) and placed in a plastic mixing container (FlackTek-speedmixer compatible). In a separate vial, 1,1,1-tris(hydroxymethyl)propane (9.84 mmoles, 1.32 g) is weighed and dissolved with a solvent mixture of acetone (6 mL), 2-butanone (4 mL), and xylene (3.5 mL). The use of a triol enables vulcanization during curing. The two solutions are combined in the mixing container and placed in the FlackTek at 2300 rpm for 15 seconds. The sample is sprayed with an HVLP gun using a 1.7 mm nozzle aperture to a thickness of 4 mils. The spray coating is then cured in an oven at a temperature of 60-80° C. for about 4 hours.

The result is a clear, highly crosslinked fluoropolymer-based film. There is not believed to be significant phase inhomogeneity on an average length scale of 0.1-500 microns, leading to lower anti-ice performance compared to Examples 1, 3, 4, 5, and 6 (see Example 10). This Example 9 can therefore be considered a less-preferred example.

Example 10: AMIL ARF Testing of Example Coatings

AMIL is the Anti-icing Materials International Laboratory located at the Université du Québec à Chicoutimi in Chicoutimi, Quebec, Canada. The icephobic character of a coating can be evaluated by measuring the ice adhesion reduction effect of a candidate coating compared to an uncoated surface. AMIL can evaluate icephobic coatings in many different atmospheric conditions (wind and temperature) with glaze or rime accreted ice obtained with a simulation of freezing precipitation.

A single "Centrifuge Adhesion Test" by AMIL consists of the ice adhesion measurement of three small aluminum beams covered with the candidate product, compared with three bare beams. The extremity of the six sample beams are iced simultaneously with freezing precipitation on about 5 $cm^2$ surface to a thickness of about 7 mm. Each sample beam is rotated and balanced in the centrifuge apparatus. The rotation speed increases with a constant acceleration rate until the centrifugal force resulting from rotation reaches the adhesion stress of ice, detaching the ice. This detachment is picked up by a piezoelectric cell (sensitive to vibrations) which relays signals in real time to a computer. Finally, the adhesion stress is calculated using detachment speed, the mass of ice, and the beam length.

The Adhesion Reduction Factor, ARF (herein also referred to as "AMIL ARF") is calculated using the average stress measured on the three coated beams compared to the average stress measured on the three bare (control) beams. In particular, from the centrifugal force the stress is determined as $F=mr\omega^2$ where F=centrifugal force [N], m=mass of ice [kg], r=radius of the beam [m], and $\omega$=speed of rotation [rad/s]. The Adhesion Reduction Factor (AMIL ARF) is then calculated using the average stress measured on the three coated beams compared to the average stress measured on the three bare beams: $ARF=\tau_{bare}/\tau_{coated}$ where $\tau_{bare}$=average stress measured on three simultaneously iced bare beams [Pa] and $\tau_{coated}$=average stress measured on three simultaneously iced beams with candidate icephobic coating [Pa]. The web site www.uqac.ca/amil/en/icephobiccoatings/centrifuge, as retrieved on May 30, 2017, is hereby incorporated by reference herein.

An ARF value of 1 means there is no icephobic effect. An ARF value greater than 1 means there is an ice-adhesion reduction (icephobic effect); the higher the value, the more icephobic the coating.

FIG. 5 shows a table of AMIL ARF data for the samples described in Examples 1, 3, 4, 5, 6, and 8. All AMIL ARF values for Examples 1, 3, 4, 5, and 6 are significantly above 10, and samples in Examples 1, 4, 5, and 6 have AMIL ARF values above 100 which represent extreme reduction in ice adhesion compared to the control substrate. The less-preferred Example 9 gives an AMIL ARF value of 10.5, which is much less than the more-preferred materials of Examples 1, 3, 4, 5, and 6. Also, AMIL public information (retrievable at the www.uqac.ca web site link above) shows ARF values of around 1 to 10 for a wide variety of solid coatings. Even silicone grease, lithium grease, or other industrial lubricants have ARF values well below 100. This result (ARF values on the order of 100 or higher) is unexpected and surprising.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A low-ice-adhesion composition comprising a composite polymer material containing at least a first-material phase and a second-material phase that is chemically distinct from said first-material phase, wherein said first-material phase and said second-material phase are nanophase-separated on an average nanophase-separation length scale from about 10 nanometers to less than 100 nanometers, wherein said first-material phase and said second-material phase further are microphase-separated on an average microphase-separation length scale that is greater than 0.2 microns to about 100 microns and is hierarchically distinct from said nanophase-separation length scale, wherein said first-material phase and said second-material phase are connected by polymer chain extension and/or polymer crosslinking, wherein said first-material phase and said second-material phase are covalently connected in a segmented block copolymer, and wherein said composite polymer material has a glass-transition temperature above −80° C.

2. The low-ice-adhesion composition of claim 1, wherein said average microphase-separation length scale is from about 0.5 microns to about 75 microns.

3. The low-ice-adhesion composition of claim 1, wherein said composite polymer material has a glass-transition temperature above 60° C.

4. The low-ice-adhesion composition of claim 1, wherein one of said first-material phase and said second-material phase is hydrophobic, and the other is hydrophilic.

5. The low-ice-adhesion composition of claim 1, wherein one of said first-material phase and said second-material phase is omniphobic, and the other is hydrophilic.

6. The low-ice-adhesion composition of claim 1, wherein one of said first-material phase and said second-material phase is hydrophobic, and the other is hygroscopic.

7. The low-ice-adhesion composition of claim 1, wherein one of said first-material phase and said second-material phase is hygroscopic, and the other comprises a low-surface-energy polymer having a surface energy between about 5 mJ/m$^2$ to about 50 mJ/m$^2$.

8. The low-ice-adhesion composition of claim 7, wherein said low-surface-energy polymer is a fluoropolymer.

9. The low-ice-adhesion composition of claim 8, wherein said fluoropolymer is selected from the group consisting of polyfluoroethers, perfluoropolyethers, polyfluoroacrylates, polyfluorosiloxanes, polytetrafluoroethylene, polyvinylidene difluoride, polyvinylfluoride, polychlorotrifluoroethylene, copolymers of ethylene and trifluoroethylene, copolymers of ethylene and chlorotrifluoroethylene, and combinations thereof.

10. The low-ice-adhesion composition of claim 1, wherein said segmented block copolymer comprises:
(a) one or more first soft segments selected from fluoropolymers having an average molecular weight from about 500 g/mol to about 10,000 g/mol, wherein said fluoropolymers are (α,ω)-hydroxyl-terminated and/or (α,ω)-amine-terminated;
(b) one or more second soft segments selected from polyesters or polyethers, wherein said polyesters or polyethers are (α,ω)-hydroxyl-terminated and/or (α,ω)-amine-terminated;
(c) one or more isocyanate species, or a reacted form thereof, possessing an isocyanate functionality of 2 or greater; and
(d) one or more polyol or polyamine chain extenders or crosslinkers, or a reacted form thereof.

11. The low-ice-adhesion composition of claim 10, wherein said fluoropolymers include a fluoropolymer having the structure:

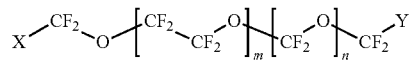

wherein:
X, Y=CH$_2$—(O—CH$_2$—CH$_2$)$_p$—OH wherein p=0 to 50 and wherein X and Y are independently selected;
m=1 to 100; and
n=0 to 100.

12. The low-ice-adhesion composition of claim 10, wherein said polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

13. The low-ice-adhesion composition of claim 1, wherein said composition is present in a coating.

14. A segmented copolymer composition comprising:
(a) one or more first soft segments selected from fluoropolymers having an average molecular weight from about 500 g/mol to about 10,000 g/mol, wherein said fluoropolymers contain an oxygen atom connected to two alkyl or aryl groups, wherein at least one hydrogen atom of said alkyl or aryl group is replaced by a fluorine atom, and wherein said fluoropolymers are (α,ω)-hydroxyl-terminated and/or (α,ω)-amine-terminated;
(b) one or more second soft segments selected from polyesters or polyethers, wherein said polyesters or polyethers are selected from the group consisting of poly(oxymethylene), poly(ethylene glycol), poly(propylene glycol), poly(glycolic acid), poly(caprolactone), poly(ethylene adipate), poly(hydroxybutyrate), poly(hydroxyalkanoate), and combinations thereof, and wherein said polyesters or polyethers are (α,ω)-hydroxyl-terminated and/or (α,ω)-amine-terminated;
(c) one or more hard segments containing a reacted form of one or more isocyanate species possessing an isocyanate functionality of 2 or greater; and
(d) in said hard segments, a reacted form of one or more polyol or polyamine chain extenders or crosslinkers,
wherein said first soft segments and said second soft segments are covalently connected with each other,
wherein said first soft segments and said second soft segments are microphase-separated on an average microphase-separation length scale that is greater than 0.2 microns to about 100 microns, and
wherein said segmented copolymer composition has a glass-transition temperature above −80° C.

15. The segmented copolymer composition of claim 14, wherein said first soft segments and said hard segments are nanophase-separated on an average nanophase-separation length scale from about 10 nanometers to less than 100 nanometers.

16. The segmented copolymer composition of claim 14, wherein said second soft segments and said hard segments are nanophase-separated on an average nanophase-separation length scale from about 10 nanometers to less than 100 nanometers.

17. The segmented copolymer composition of claim 14, wherein said fluoropolymers are selected from the group consisting of perfluoropolyethers, polyfluoroacrylates, polyfluorosiloxanes, and combinations thereof.

18. The segmented copolymer composition of claim 14, wherein said fluoropolymers include a fluoropolymer having the structure:

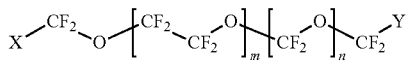

wherein:
X, Y=CH$_2$—(O—CH$_2$—CH$_2$)$_p$—OH wherein p=0 to 50 and wherein X and Y are independently selected;
m=1 to 100; and
n=0 to 100.

19. The segmented copolymer composition of claim 14, wherein said isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

20. The segmented copolymer composition of claim 14, wherein at least one of said one or more polyol or polyamine chain extenders or crosslinkers possesses a functionality of 2 or greater.

21. The segmented copolymer composition of claim 14, wherein at least one of said one or more polyol or polyamine chain extenders or crosslinkers is selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N', N'-tetrakis(2-hydroxypropyl)ethylenediamine, and homologues, derivatives, or combinations thereof.

22. The segmented copolymer composition of claim 14, wherein said composition is present in a coating.

* * * * *